(12) United States Patent
Sung et al.

(10) Patent No.: US 11,450,010 B2
(45) Date of Patent: Sep. 20, 2022

(54) REPETITION COUNTING AND CLASSIFICATION OF MOVEMENTS SYSTEMS AND METHODS

(71) Applicant: NEX Team Inc., San Jose, CA (US)

(72) Inventors: On Loy Sung, Lai Chi Kok (HK); Qi Zhang, Tseung Kwan O (HK); Keng Fai Lee, Cupertino, CA (US); Shing Fat Mak, Kowloon (HK); Daniel Dejos, Seattle, WA (US); Man Hon Chan, Kowloon (HK)

(73) Assignee: NEX Team Inc., San Jose, CA (US)

(*) Notice: Subject to any disclaimer, the term of this patent is extended or adjusted under 35 U.S.C. 154(b) by 0 days.

(21) Appl. No.: 17/503,295

(22) Filed: Oct. 16, 2021

(65) Prior Publication Data

US 2022/0138966 A1   May 5, 2022

Related U.S. Application Data

(60) Provisional application No. 63/107,447, filed on Oct. 30, 2020.

(51) Int. Cl.
*G06T 7/246* (2017.01)

(52) U.S. Cl.
CPC .... *G06T 7/246* (2017.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

2014/0270387 A1\* 9/2014 Hoof ............... A63F 13/06
                                                      382/107
2017/0032538 A1\* 2/2017 Ernst ............... G06T 7/0012

OTHER PUBLICATIONS

Fitnet, "Personal Trainer for Everyone", Fitnet-Video Fitness Trainer. Accessed Sep. 2021. Available at: http://fit.net/.
Krishna Raj R., "Human Pose Comparison and Action Scoring using Deep Learning, OpenCV & Python", Analytics Vidhya Medium, Apr. 13, 2020, pp. 1-12.

(Continued)

*Primary Examiner* — Matthew C Bella
*Assistant Examiner* — Brian D Shin
(74) *Attorney, Agent, or Firm* — American Patent Agency PC; Daniar Hussain

(57) ABSTRACT

Methods and systems for determining and classifying a number of repetitive motions in a video are described, and include the steps of first determining a plurality of images from a video, where the images are segmented from at least one video frame of the video. Next, performing a pose detection process on a feature of the images to generate one or more landmarks. Next, determining one or more principle component axes on points associated with a given landmark. Finally, determining at least one repetitive motion based on a pattern associated with a projection of the points onto the one or more principle components. In some embodiments, the disclosed methods can classify the repetitive motions to respective types. The present invention can be implemented for convenient use on a mobile computing device, such as a smartphone, for tracking exercises and similar repetitive motions.

20 Claims, 21 Drawing Sheets

(56) References Cited

OTHER PUBLICATIONS

Tempo, "AI-Powered Home Gym With Personalized Guidance for Every Workout", The Award-Winning AI-Powered Home Gym. Accessed Sep. 2021. Available at: https://tempo.fit/.

Mirror, "The Nearly Invisible Home Gym", The holy grail of home gyms. Accessed Sep. 2021. Available at: https://www.mirror.co/.

* cited by examiner

300

900 highknee
902 joginplace
904 jumpingjack
906 jumprope
908 lunge
912 squat
914 squatjump
916

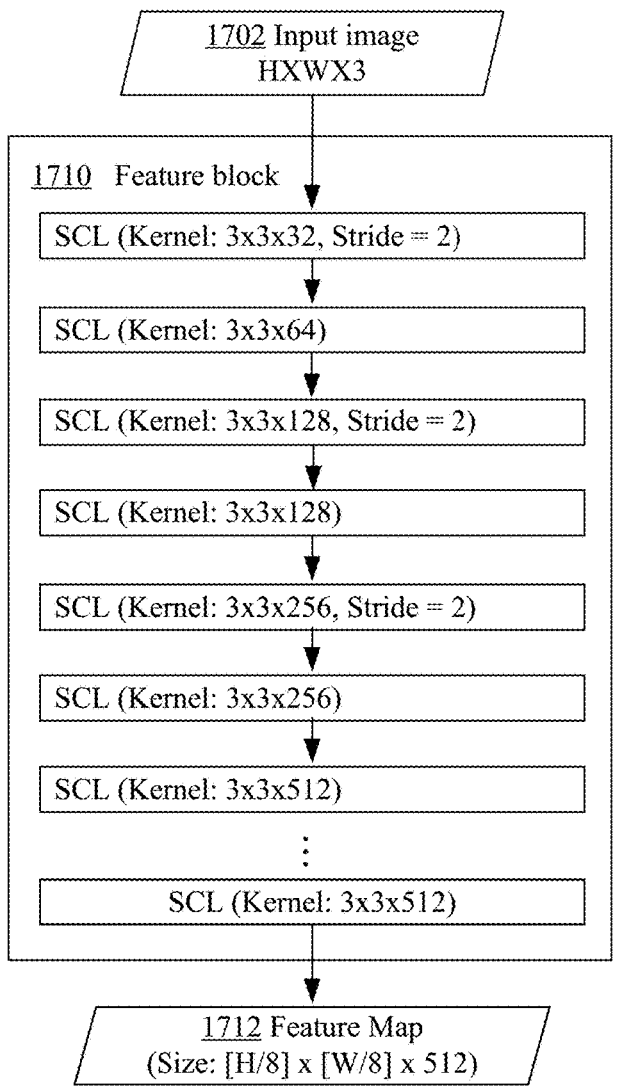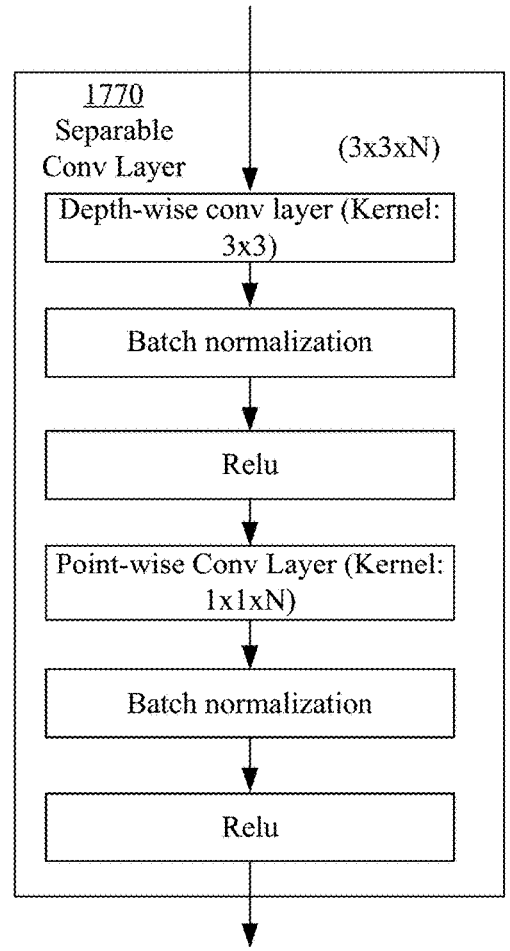
*FIG. 17B*  *FIG. 17C*

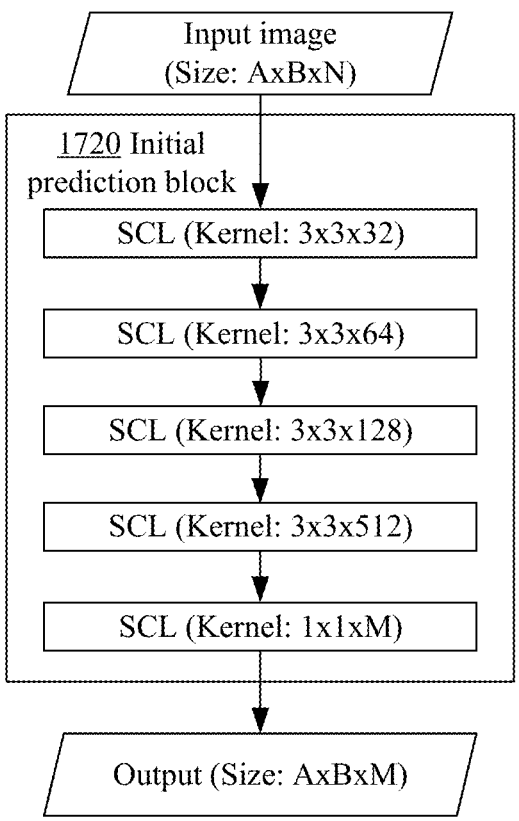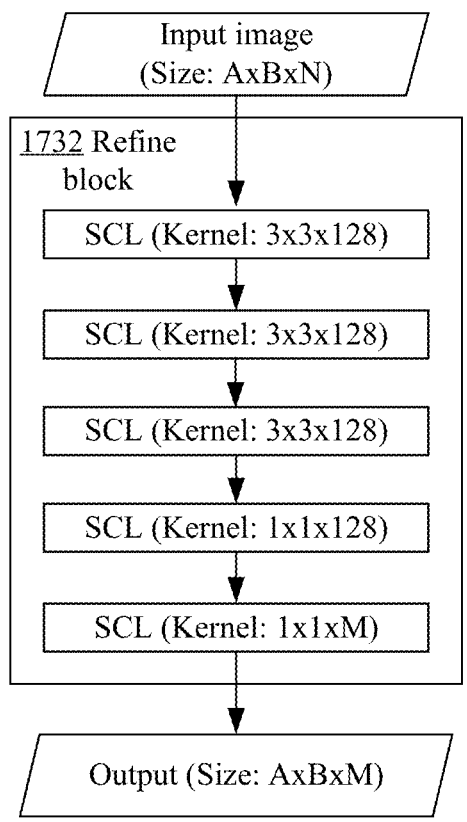
FIG. 17D
FIG. 17E

REPETITION COUNTING AND CLASSIFICATION OF MOVEMENTS SYSTEMS AND METHODS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Ser. No. 16/109,923, filed on 23 Aug. 2018, entitled "Methods and Systems for Ball Game Analytics with a Mobile Device", and to U.S. Ser. No. 16/424,287, filed on 28 May 2019, entitled "Methods and Systems for Generating Sports Analytics with a Mobile Device".

This application is further related to U.S. Ser. No. 16/862,753, filed on 30 Apr. 2020, entitled "REMOTE MULTI-PLAYER INTERACTIVE PHYSICAL GAMING WITH MOBILE COMPUTING DEVICES", and to U.S. Ser. No. 16/792,190, filed on 15 Feb. 2020, entitled "METHODS AND SYSTEMS FOR FACILITATING INTERACTIVE TRAINING OF BODY-EYE COORDINATION AND REACTION TIME".

The entire disclosures of all referenced applications are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of general fitness (including exercising and training) and pertain particularly to methods and systems for repetition counting and classification of movements, for example, using pose estimation techniques.

BACKGROUND OF THE INVENTION

The statements in this section may serve as a background to help understand the invention and its application and uses, but may not constitute prior art.

Modern computing technology has brought in a new era of rapid real-time analysis of sports activities. In some respects, the real-time analysis can be performed on exercise and fitness activities to generate statistics but may incur additional computing overhead and have associated challenges. Further, real-time tracking technology based on image recognition often requires use of multiple high-definition cameras used for capturing visual data from multiple camera arrays positioned at multiple perspectives, calibration for different environments, and massive processing power in high-end desktop and/or server-grade hardware to analyze the data from the camera arrays. Therefore, in view of the aforementioned difficulties, there is an unsolved need to detect key events easily and accurately in various physical activities undertaken by players, understand their motions, generate analytics, and provide relevant tracking and analytical results to viewers in an efficient manner.

It is against this background that various embodiments of the present invention were developed.

BRIEF SUMMARY OF THE INVENTION

In various respects, methods and systems are provided for analyzing and classifying a number of repetitive motions in a video. Tracking and counting of repetitive motions by a user (e.g., a player and/or anyone who exercises or trains) and classifying associated movements would be particularly useful for training exercises. Such aspects would represent an advancement in the state of the art, especially if the analysis was performed while maintaining minimal delay and data transfer overhead, such that the entire system can be implemented on a single mobile computing device, such as a smartphone or tablet.

Accordingly, in various embodiments, a method for determining a number of repetitive motions in a video is described. The method can include determining a plurality of images from a video, where the images are segmented from at least one video frame of the video; performing a landmark detection process on a feature of the plurality of images to generate one or more landmarks; determining one or more principle component axes on a plurality of points associated with a given landmark of the one or more landmarks; and determining at least one repetitive motion based on a pattern associated with a projection of the plurality of points onto the principle component axes.

In one embodiment, the plurality of images can include a first image and a second image. Further, the performing of the landmark detection process respectively generates a first landmark and a second landmark, and the determination of the repetitive motion further can include determining a first pattern and a second pattern. Additionally, the method further includes determining a deduplicated pattern based on a comparison of the first pattern and the second pattern, and determining the at least one repetitive motion based on the deduplicated pattern.

In another embodiment, the determining of the at least one repetitive motion based on the pattern can further include generating a distance time series data vector based on the projection of the plurality of points onto the one or more principle component axes, generating a second time series data based on a determination of the maxima of the distance time series data vector, determining zero crossings of the second time series data, and determining a number of zero-crossing pairs having associated opposing directions based on the zero crossings. In some embodiments, the generating of a second time series data based on maxima of the distance time series data vector can further include maximizing a function including a linear combination of components of the distance time series data vector.

In one embodiment, the determination of the zero crossings of the second time series data can further include performing a debouncing process, where a first deviation from a first zero crossing and a second deviation from a second zero crossing have a difference in magnitude below a predetermined threshold, and where the first zero crossing and the second zero crossing can be determined as a same zero crossing.

In some embodiments, the landmark detection process includes determining points identifying the landmark's motion and a duration parameter associated with the duration of the at least one repetitive motion, and inputting the points and the duration parameter to a machine learning algorithm to obtain a classification result of the repetitive motion, the classification result identifying the repetitive motion into a predetermined type. In one embodiment, the machine learning algorithm can include a multi-layer neural network.

In another embodiment, the video can be captured by a camera on a mobile device. In some embodiments, the feature can include at least one of a moving object and at least a portion of a body of a moving human.

In various embodiments, a non-transitory computer-readable medium storing computer-executable instructions which, when executed by a processor, cause the processor to perform operations for determining a number of repetitive motions in a video is described. In some respects, the operations can include steps to determine a plurality of images from a video, where the plurality of images are segmented from at least one video frame of the video; perform a landmark detection process on a feature of the plurality of images to generate one or more landmarks; determine one or more principle component axes on a plurality of points associated with a given landmark of the one or more landmarks; and determine at least one repetitive motion based on a pattern associated with a projection of the plurality of points onto the one or more principle component axes.

In some embodiments, the plurality of images include a first image and a second image, where the step to perform the pose detection respectively generates a first landmark and a second landmark, where the step to determine the repetitive motion further determines a first pattern and a second pattern, and the operations further include steps to determine a deduplicated pattern based on a comparison of the first pattern and the second pattern, and determine the at least one repetitive motion based on the deduplicated pattern.

In other embodiments, steps to determine the at least one repetitive motion based on the pattern further include steps to generate a distance time series data vector based on the projection of the points onto the principle component axes, generate a second time series data based on a determination of the maxima of the distance time series data vector, determine zero crossings of the second time series data, and determine a number of zero-crossing pairs having associated opposing directions based on the zero crossings.

In one embodiment, the step to generate a second time series data based on maxima of the distance time series data vector further includes a step to maximize a function including a linear combination of components of the distance time series data vector. In another embodiment, the step to determine the zero crossings of the second time series data can further include a step to perform a debouncing process, where a first deviation from a first zero crossing and a second deviation from a second zero crossing have a difference in magnitude below a predetermined threshold, and where the first zero crossing and the second zero crossing are determined as a same zero crossing.

In some embodiments, the landmark detection process includes steps to determine points identifying the landmark's motion and a duration parameter associated with the duration of the at least one repetitive motion, and input the points and the duration parameter to a machine learning algorithm to obtain a classification result of the repetitive motion, the classification result identifying the repetitive motion into a predetermined type. In other embodiments, the machine learning algorithm can include a multi-layer neural network.

In one embodiment, the video can be captured by a camera on a mobile device. In other embodiments, the feature can include at least one of a moving object and at least a portion of a body of a moving human.

In various embodiments, a device for determining a number of repetitive motions in a video is described. The device can include a camera and a processor, where the processor is configured to determine a plurality of images from a video, where the plurality of images are segmented from at least one video frame of the video; perform a landmark detection process on a feature of the plurality of images to generate one or more landmarks; determine one or more principle component axes on a plurality of points associated with a given landmark of the one or more landmarks; and determine at least one repetitive motion based on a pattern associated with a projection of the plurality of points onto the one or more principle component axes.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 17B is a detailed block diagram illustrating an exemplary Feature Block of FIG. 17A, according to exemplary embodiments of the present invention;

FIG. 17C is a detailed block diagram illustrating an exemplary separable convolutional neural network layer of FIG. 17A, according to exemplary embodiments of the present invention;

FIG. 17D is a detailed block diagram illustrating an exemplary Initial Prediction Block of FIG. 17A, according to exemplary embodiments of the present invention;

FIG. 17E is a detailed block diagram illustrating an exemplary Refine Block of FIG. 17A, according to exemplary embodiments of the present invention;

DETAILED DESCRIPTION OF THE INVENTION

Overview

Figure 1:
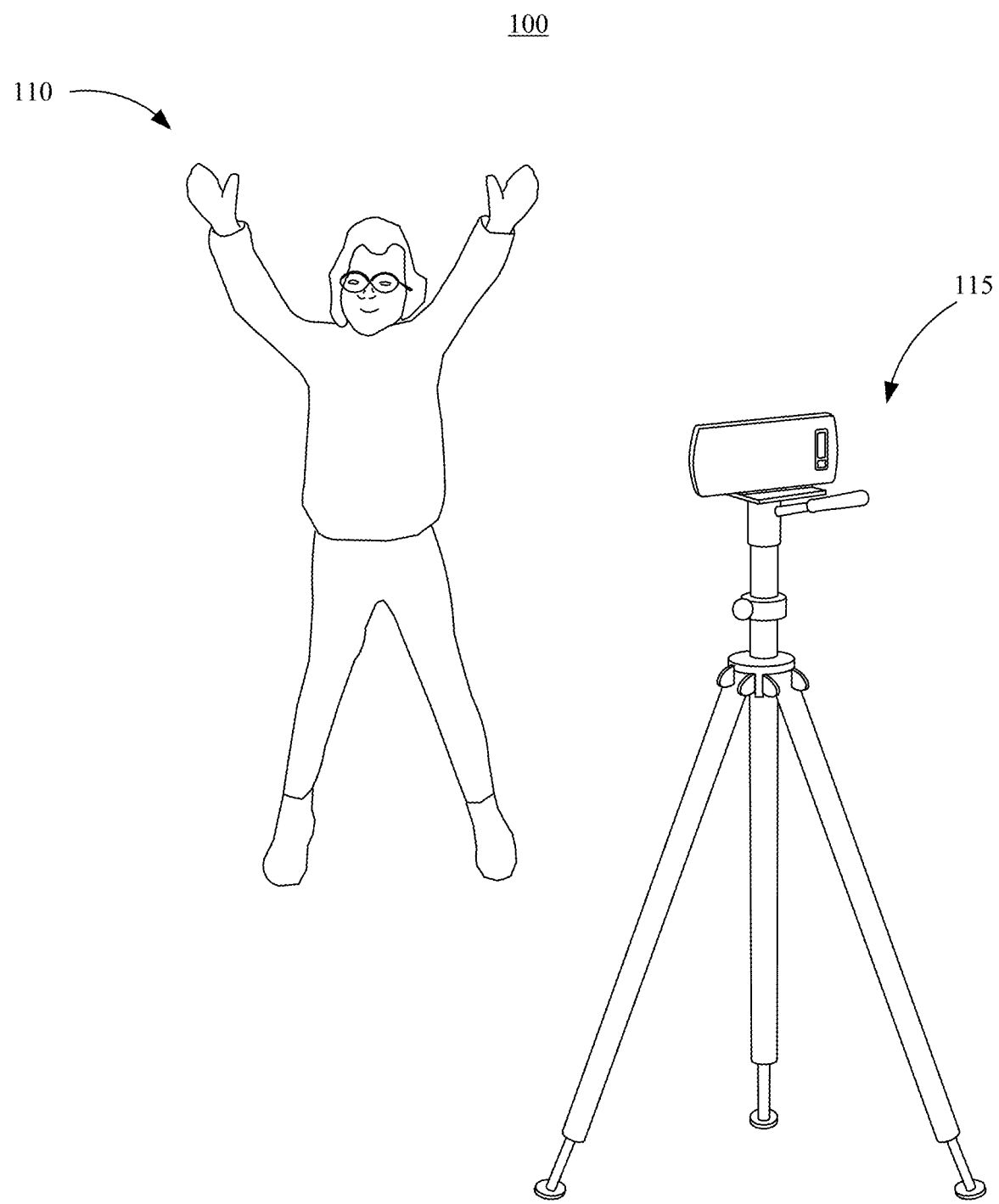
FIG. 1 is an exemplary setup for detecting a repetitive motion with a mobile computing device, in accordance with example embodiments of the disclosure.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Broadly, embodiments of the present invention relate to real-time analysis of repetitive motion analysis (for example, motions that occur as part of a fitness/training use case and/or a game or game play) using personal computing devices, such as smartphones and tablets. It would be understood by persons of ordinary skill in the art that the terms "fitness" and "training" in this disclosure can refer to individual to group-based movements associated with exercise, dance, and/or the like. Further, "game" and "game play" in this disclosure refer to not only competitive activities involving opposing teams, but also individual and group practice or drilling activities, which can include repetitive motions. In other words, embodiments of the present invention may be used for capturing and analyzing activities and associated repetitive motions, as long as there is at least one user present and being recorded.

More specifically, some embodiments of the present invention relate to determining repetitive motions and counting those repetitive motions in a media file such as in a video. In some embodiments, the method can be implemented in real time. In another aspect, the disclosed systems can implement the method in an incremental fashion on subsequent frames of a video. In some aspects, at least a portion of the operations below can be repeated for each video frame. The method can include, but not be limited to, the operations of: determining a plurality of images from a video, wherein the images are segmented (e.g., the images are partitioned into multiple segments (sets of pixels) and can be performed using any suitable technique including, but not limited to, thresholding, k-means, edge detection, neural networks, combinations thereof, and/or the like) from at least one video frame of the video; performing a landmark detection process on a feature of the images to generate landmarks; determining principle component axes (e.g., first, second, third, or high order principle components) on points associated with a landmark of the landmarks and can optionally apply a filter (e.g., a video filter including a high/low/band-pass filter to at least a portion of points identifying the landmarks over the time domain; and determining at least one repetitive motion based on a pattern associated with a projection of the points onto principle components (e.g., each principle axis that is employed), as described further below.

As noted, again, the disclosed systems can be configured to optionally apply a filtering step including, but not limited to, a high/low/band-pass filtering step to at least a portion of the points, which can further be provided in the time domain (e.g., as opposed to a spatial domain). In some embodiments, the images include a first image and a second image, the performing the pose detection respectively generates a first landmark and a second landmark, the determination of the repetitive motion further includes determining a first pattern and a second pattern, and the method further includes: determining a deduplicated pattern based on a comparison of the first pattern and the second pattern; and determining the at least one repetitive motion based on the deduplicated pattern.

In some embodiments, the repetitive motions can include dance moves, workout moves, or any move with a periodic or quasi-periodic nature (within a predetermined error tolerance). Moreover, the disclosed systems can be configured to classify the repetitive motions (e.g., with a label), for example, by using one or more machine learning techniques. One of ordinary skill in the art will appreciate that such embodiments can be used in a variety of combinations to allow for the movements multiple players to be tracked and analyzed, whether the players are playing an organized game and/or sport or performing another activity such as a training session, a dance session, and/or the like.

Unlike some computer vision-based real-time sports analysis systems that may require several cameras (e.g., high-resolution cameras) mounted on top of or sidelines of a ball field and the use of high-end desktop or server hardware, embodiments of the present invention allow users to perform real-time or near real-time analysis of ball sport games with a single mobile device such as a smartphone, a tablet, a laptop, or smart glasses. In various embodiments, various methods including, but not limited to, computer vision techniques such as image registration, motion detection, background subtraction, object tracking, 3D reconstruction techniques, cluster analysis techniques, camera calibration techniques (such as camera pose estimation and sensor fusion), and one or more machine learning techniques (such as convolutional neural network (CNN)), can be selectively combined to perform relatively high accuracy analysis in real-time or near-real time on a mobile device or on a mobile device in combination with a second device (e.g., a second mobile device, a server, an edge server, combinations thereof, and/or the like).

The limited computational resources in a mobile device may present some challenges. For instance, some examples can include the fact that a smartphone's limited central processing unit (CPU) processing power can be heat-sensitive. CPU clock rate can be reduced by the operating system (OS) whenever the phone heats up. Also, when a system consumes too much memory, it can get terminated by the operating system (OS). The amount of battery use that the analytics system consumes can be a factor to minimize, otherwise the limited battery on a smartphone may not last a predetermined threshold duration (e.g., the duration of a whole game). In various embodiments, the disclosed systems and methods can serve to increase computational efficiency for running these techniques on a mobile device and can for example, reduce the amount of power usage by the mobile device, leading to increased battery lifetime.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

Outline of Figures

Before presenting addition disclosure, a brief summary of the figures is provided for clarity and readability.

Figure 11:
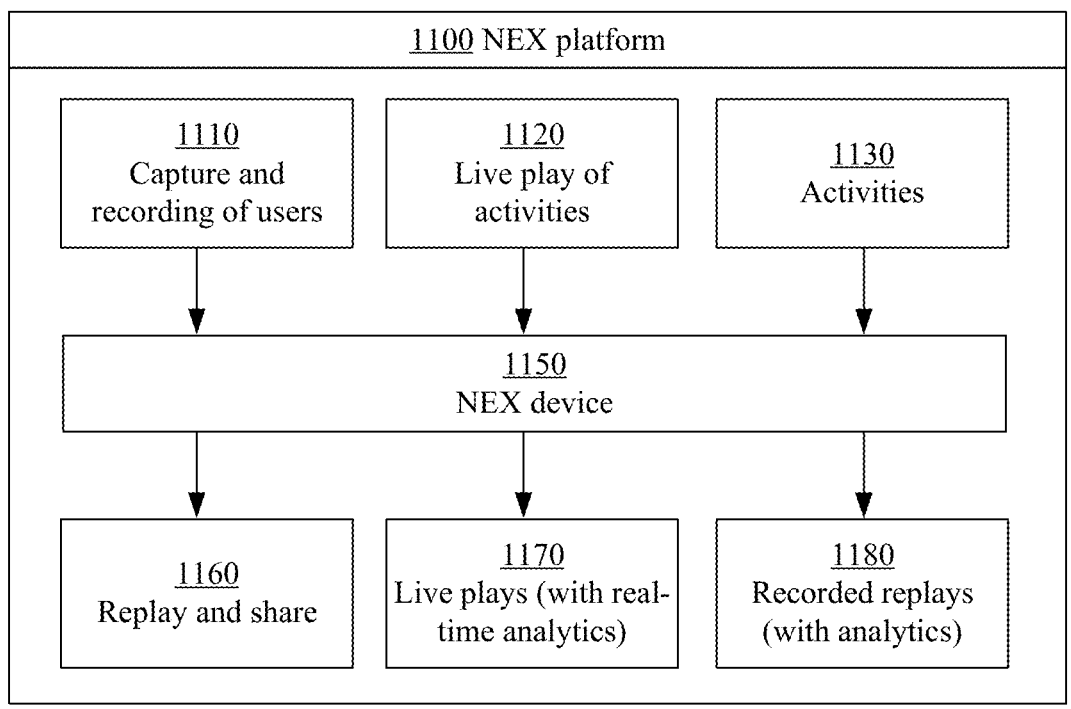
FIG. 11 is a schematic diagram illustrating a NEX platform, according to one embodiment of the present invention.
Figure 12:
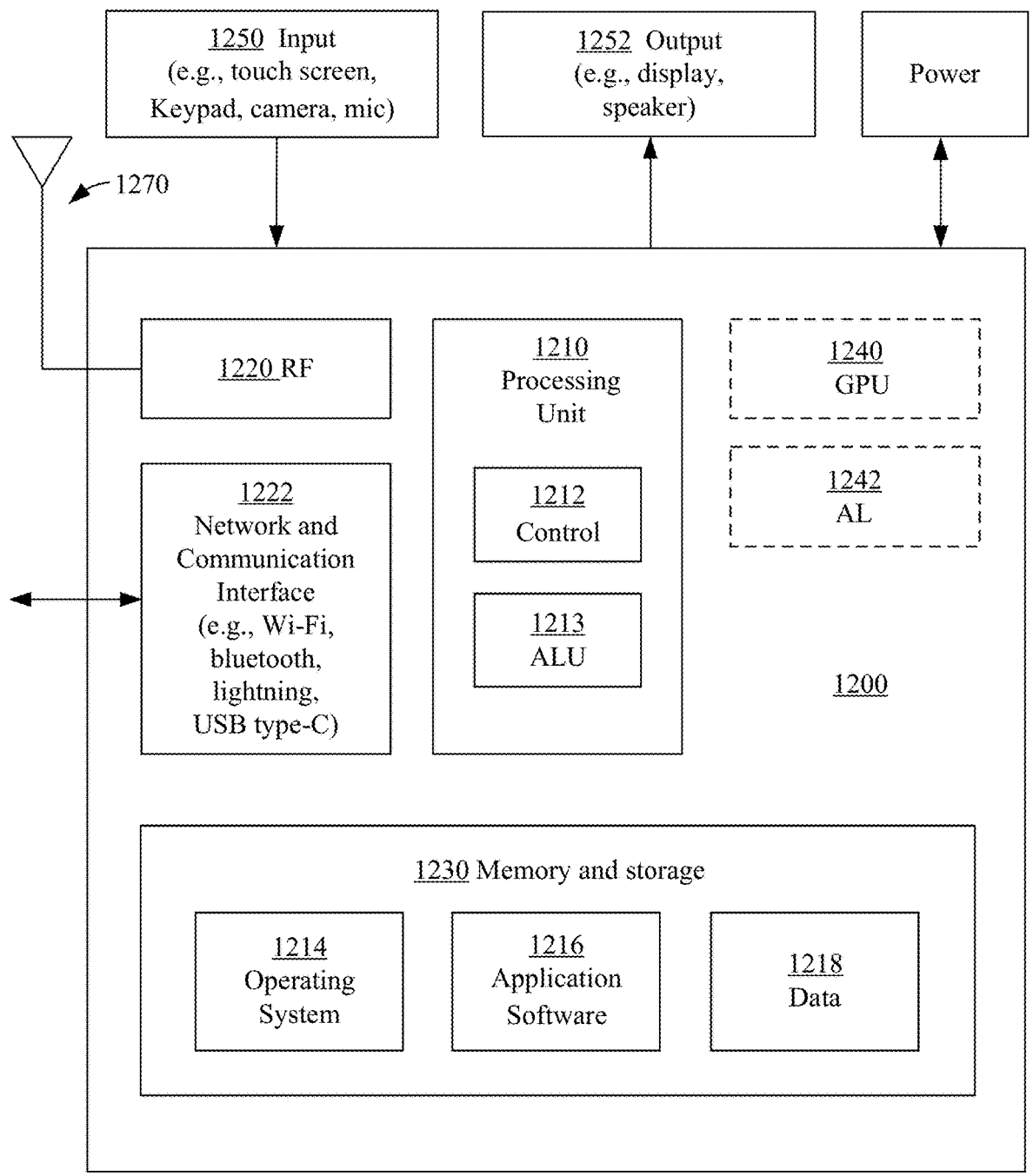
FIG. 12 is an exemplary schematic diagram of a user computing entity for implementing a repetition counting system, according to exemplary embodiments of the present invention.
Figure 13:
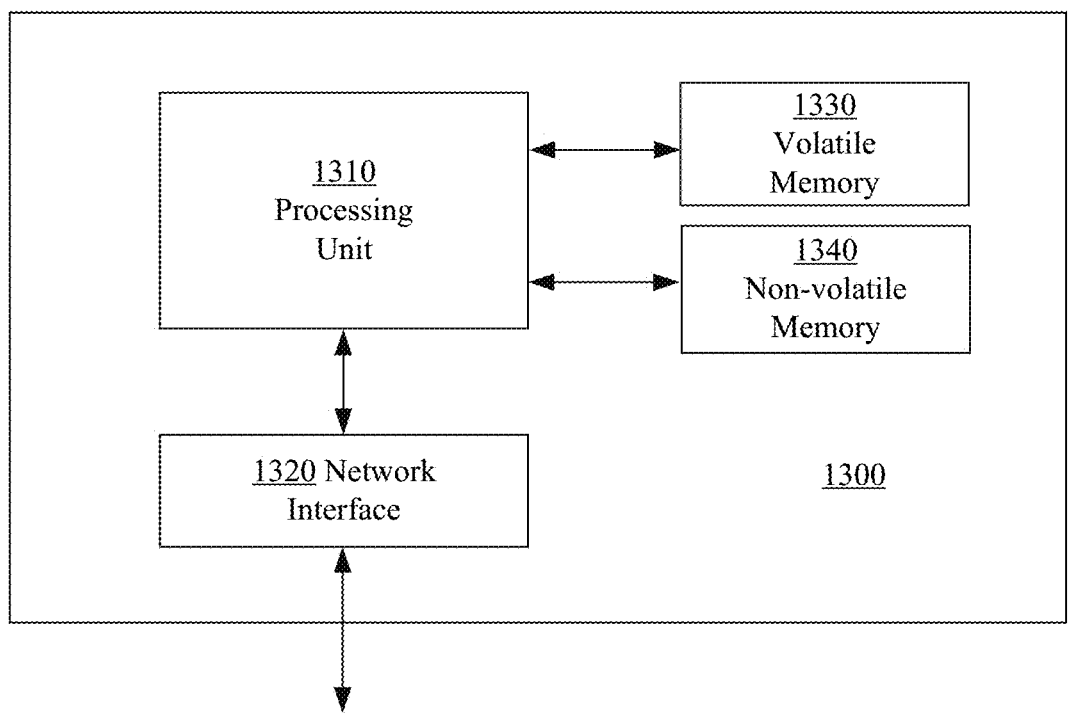
FIG. 13 is an exemplary schematic diagram of a management computing entity for implementing a repetition counting system, according to exemplary embodiments of the present invention.

FIGS. 1-10 represent figures that include some of the embodiments associated with systems and methods for real-time generic repetition counting and classification through pose estimation, as further described below. FIG. 11 is a schematic diagram showing an illustrative full NEX platform within which the present invention may be implemented. FIGS. 12-13 show schematic diagrams of computing devices in which the present invention may be implemented. Finally, FIGS. 14-18 illustrate operations associated with various machine learning components of the disclosed systems which may aid with implementation of the present invention.

Repetition Counting Systems and Methods

Some embodiments of the invention relate to systems, methods, and apparatuses for determining repetitive motions made by a user and counting those repetitive motions (e.g., dance moves, workout moves, gestures, combinations thereof, and/or the like). Moreover, the disclosed systems can be configured to classify data associated with the repetitive motions (e.g., with a label), for example, by using one or more machine learning techniques. One of ordinary skill in the art will appreciate that such embodiments can be used in a variety of combinations to allow for the movements of one or more players to be tracked and analyzed, whether the players are playing an organized game or performing another activity such as a training session, a dance session, and/or the like. In some embodiments, the motion of one or more users can be tracked using a machine learning technique (or any other suitable computer-implemented technique). For example, the disclosed systems can use machine learning-based convolutional neural network (CNN) models to predict landmarks per frame for a sequence of input video frames. In some aspects, the neural networks may need to recognize essential points of interest (e.g., inside or outside the bounding box) in the input image, which can be referred to as landmarks herein.

In some respects, a neural network (e.g., a CNN) can be used to detect objects and then localize by predicting coordinates of the bounding box around the objects to perform the landmark detection process. In one aspect, for the landmark detection process, the disclosed system can receive input images (e.g., video frames of users) and provide an output via a machine learning algorithm (e.g., a CNN) that includes a probability of finding an object, and coordinates of a bounding box around the object. Further details of such a neural network are provided below.

In some embodiments, a convolutional neural network (CNN) may be applied to some or all frames of the video to detect objects and users and their respective postures. A tracking algorithm may be performed to track all detected objects and postures, where multiple objects or users may be present in each frame of the video, to generate multiple objects flows and posture flows. In some embodiments, a flow refers to object instances from different frames. All object instances in the same flow may be considered the same object. In other words, for an object or posture in a flow, all instances of the object or posture in all frames of the video are identified as the same object or user. In various embodiments, object clustering or classification methods such as k-means, affinity propagation, density-based spatial clustering of applications with noise (DBSCAN) and/or k-nearest neighbors (KNN) may be applied to differentiate detected user/object images into users/objects.

When a single user is being recorded, a single posture flow may be detected and associated with the user directly. When multiple users are being recorded, the system may distinguish the players based on visual features such as jersey colors, or distinguishing facial or body features, and each user may register with system before the start of the session by logging in such visual features. For example, in a single-device, multi-player, "2-player reaction" training session, the camera on the mobile computing device may capture sufficient training area to allow two users to train together, where the two users compete in responding to the visual cue.

In some respects, to detect objects of interest such as court lines, balls and users from frames of the input video, one or more CNNs may be applied. Each CNN module may be trained using one or more prior input videos. A CNN utilizes the process of convolution to capture the spatial and temporal dependencies in an image, and to extract features from the input video for object detection. Feature extraction in turn enables segmentation or identification of image areas representing these objects such as balls and players, and further analysis to determine player body postures. A ball moves through space, leading to changing size and location from video frame to video frame. A player also moves through space while handling the ball, leading to both changing locations, sizes, and body postures.

In computer vision, pose or posture estimation is the task of identifying or detecting the position and orientation of an object in an image, relative to some coordinate system. This is generally formulated as the process of determining key point locations that describe the object. In the case of a ball, pose estimation may refer to determining the center and radius of the ball in the image plane. Hand pose estimation, on the other hand, is the process of determining finger joints and fingertips in a given image, where the whole hand is viewed as one object. Head pose estimation is the process of determining and analyzing facial features to obtain the 3D orientation of human head with respect to some reference point. Human pose estimation is the process of detecting major parts and joints of the body, such as head, torso, shoulder, ankle, knee, and wrist. In this disclosure, a "player image" refers to the image of a human player segmented from the input video, for example as defined by a bounding box; "posture" and "pose" are used interchangeably to refer to either a player image or a set of key points extracted from the player image to represent body pose or posture. In addition, instead of only determining whether an object such as a ball or a player is present in a given video frame, object detection or extraction in the present disclosure refers to determining the relative position, size, and/or pose of a ball, player, or other entities of interest.

FIG. 1 shows a diagram of an exemplary setup for enabling the detection of a repetitive motion with a mobile computing device, in accordance with example embodiments of the disclosure. As shown in diagram 100, in one aspect, a user or player 110 can perform an activity (e.g., training for an exercise) in front of a mobile computing device 115, which can optionally be secured on a mounting apparatus. The optional mounting apparatus may be a tripod or a kickstand or any similar apparatus providing a stable view of the user. In some examples, during a training session, an embodiment of the NEX system implemented on mobile computing device 115 may provide audio or visual instructions, goals, or cues, for user 110 to perform a next movement or set of movements. Such instructions, goals, or cues, can in some examples, be used to improve the performance of one or more machine learning techniques used to classify the user's movement patterns. Mobile computing device 115 may comprise one or more cameras for capturing a training video of user 110, for example using a front-facing camera, for computer vision-based, real-time, near real-time, or off-line posture analysis. The captured training video may be presented to the user through a display screen on the mobile computing device (or the display screen of a second device such as a second mobile device), with or without superimposed graphical or textual instructions, cues, analytics, statistics, or other visual training information add-ons. In some embodiments, mobile computing device 115 may be coupled to a larger external display, through a wireless or wired connection, such that the user may see the captured training video and optional training information with better clarity.

Figure 2:
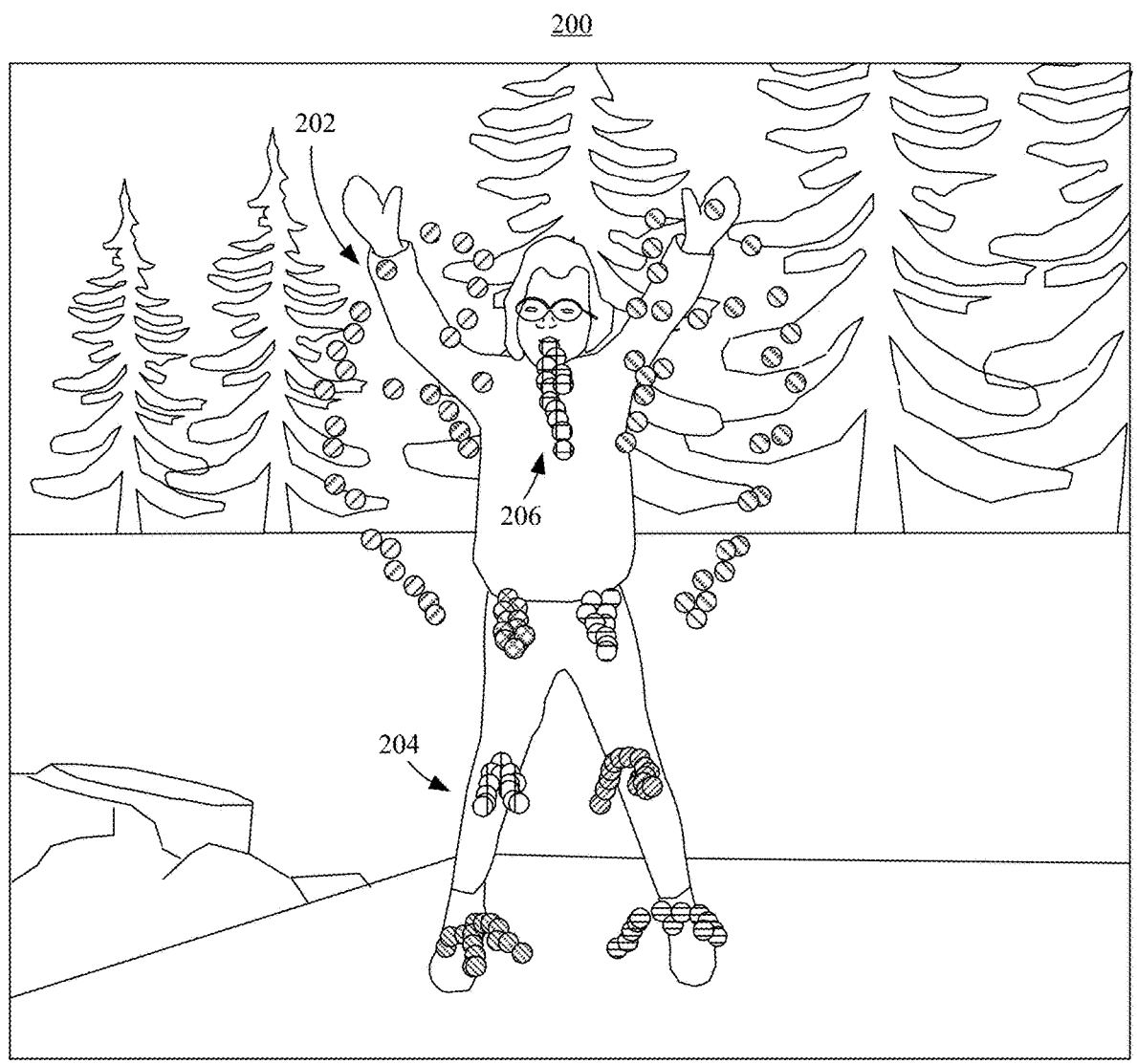
FIG. 2 shows a diagram of a user that is performing a motion that can be tracked, in accordance with example embodiments of the disclosure.

FIG. 2 shows a diagram 200 of a user that is performing a motion that can be tracked, in accordance with example embodiments of the disclosure. In some embodiments, the disclosed systems can be configured to optionally apply a filter such as any of a high pass, a low pass, and/or a band-pass filter to representations of the motion (e.g., representations of the motion in the time domain) prior to performing further processing steps variously described herein. In particular, the motion of the user can have a repetitive nature (e.g., jumping jacks as shown being performed by user 202 in diagram 200) that are periodic for a predetermined duration (e.g., 0.1 seconds, 5 seconds, 1 minute, 5 minutes, etc.) to within a threshold error tolerance (e.g., about 1%, about 5%, etc.). In some embodiments, the motion can include different components corresponding to different portions of the user's body. For example, the user may perform a composite motion where the arms of the user may be moving in a first pattern 204, while the legs of the user may be moving in a second pattern 206, and the neck and/or torso of the user may be moving in a third pattern 208. In some embodiments, the disclosed systems can be configured, via various computer-implemented techniques, to detect the repetitive motions and may be further configured to separate out and/or group repetitive motions associated with different body parts which act in unison as part of a single overall motion. In various embodiments, the disclosed systems can use a Principal Component Analysis (PCA) technique (or any other suitable technique) to perform Generic Repetition Counting and Classification through Pose Estimation. In some embodiments, the disclosed systems can use PCA to determine the principle axes of motion (e.g., each of three mutually perpendicular axes in a body about which the moment of inertia of the body is at a maximum) associated with the movements of a user. Further, the disclosed systems can use PCA to further determine the displacement of a portion of the user's body with respect to those principle axes by a projection onto the principle axes.

Figure 3:
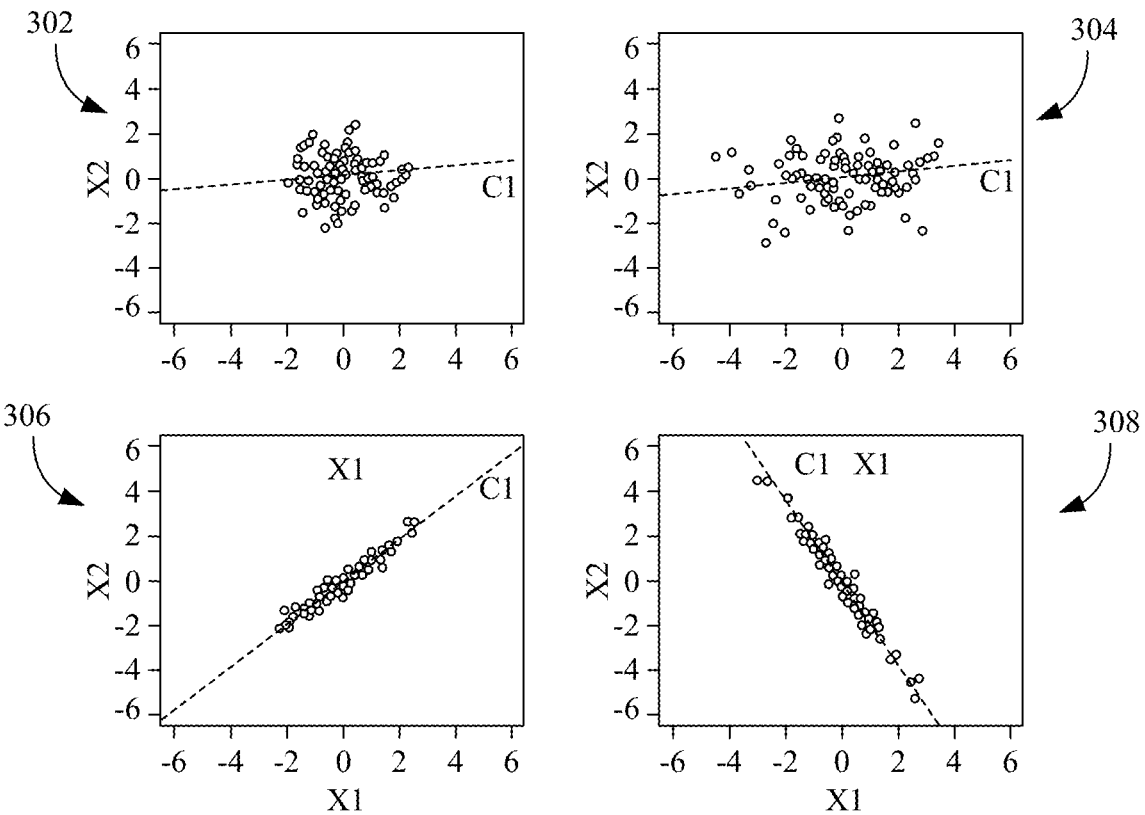
FIG. 3 shows a diagram of different plots associated with a principle component analysis (PCA) of common motions undertaken by a user, in accordance with example embodiments of the disclosure.
Figure 3:
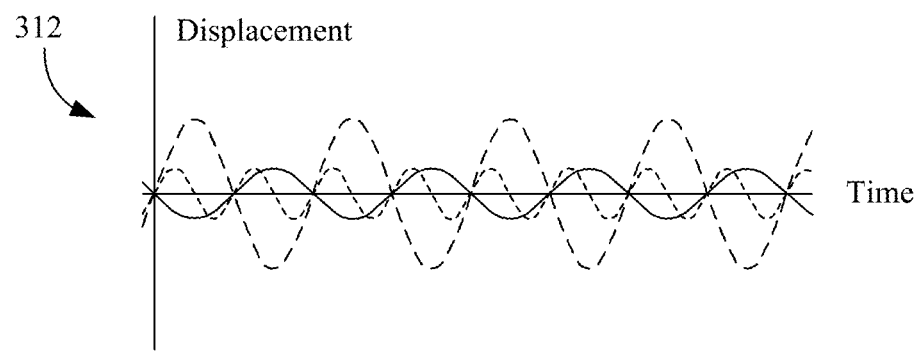

FIG. 3 shows a diagram 300 of plots 302, 304, 306, and 308 associated with a PCA of common motions undertaken by a user, in accordance with example embodiments of the disclosure. For example, as can be seen in any of plots 302, 304, 306, or 308, motions in two axes X1 and X2 (representing physical axes with respect to a user's body and/or the video frame) can be plotted and projected onto a PCA-derived axis C1. It is understood that while some of the described embodiments herein are associated with projecting the motion of the user's body into one (and its first) principle axis, it is understood that the disclosed systems do not necessarily only project the motion onto one principal axis. Rather, the disclosed systems can be configured (e.g., via a user-defined parameter) to determine the number of principal axes (e.g., first, second, third, etc. principle axes) to project each landmark motion. Diagram 300 further shows plot 312 in which displacements of a tracked portions of the user's body can be graphed in time, the displacements further being projected onto principle component axes as determined via the PCA technique. As noted, the disclosed systems can perform the same projection on the first, second, third, fourth, etc., principle axis components and can use any number of these projections.

Figure 4:
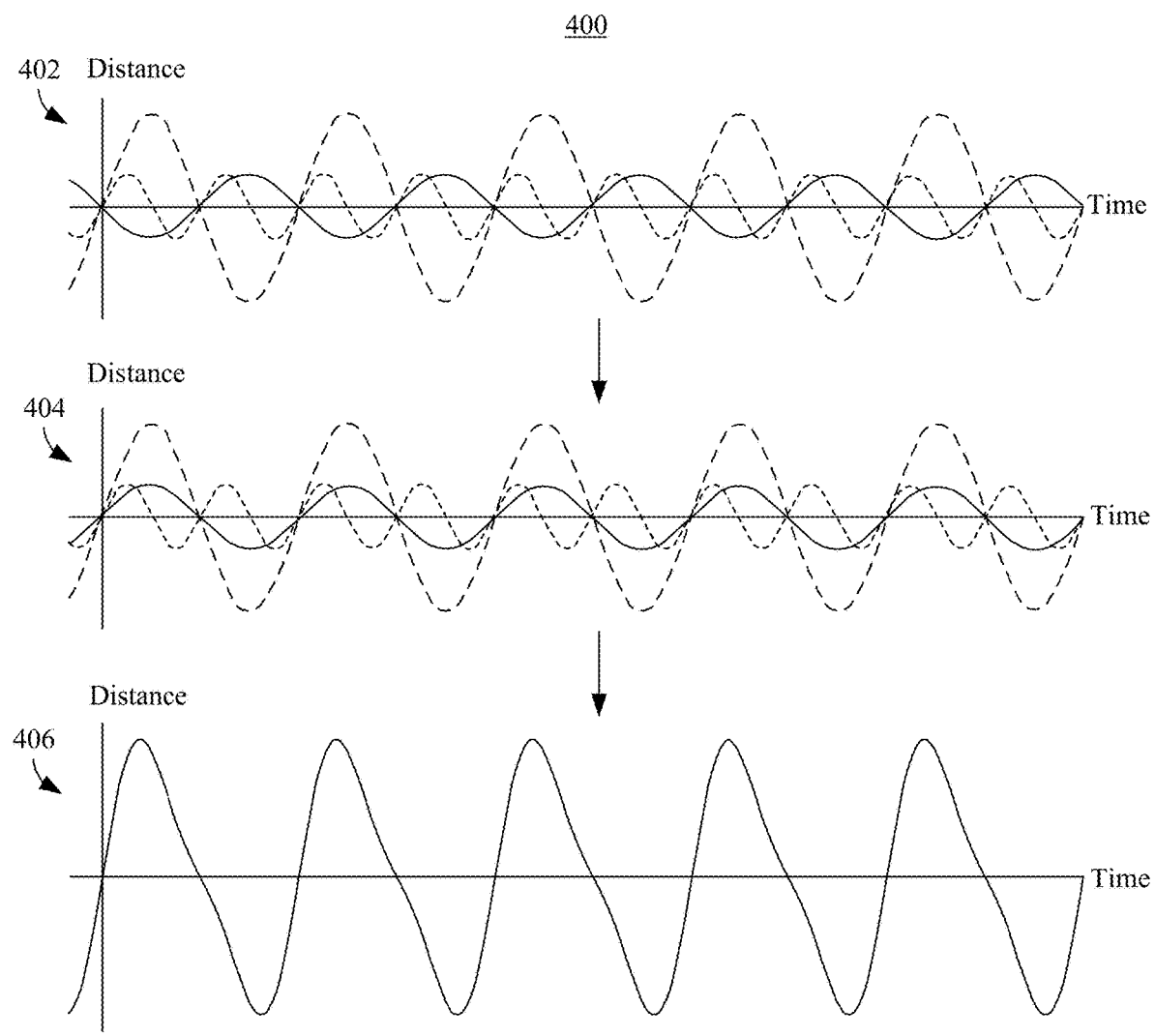
FIG. 4 shows a flow of how multiple (e.g., three, in this case) distance-time series can be maximally combined, in accordance with example embodiments of the disclosure.

FIG. 4 shows a flow of how multiple (e.g., three, in this case) distance-time series can be maximally combined, in accordance with example embodiments of the disclosure. In particular, diagram 400 shows (1) the original three distance-time series in plot 402, (2) a flip of the polarity of one of the series such that combining the series results in a maximum outcome according to an objective function (e.g., a function representing the sum of a normalization such as an L2 norm) as shown in plot 404, and (3) the resultant single distance-time series after combination as shown in plot 406.

Further, plot 402 represents dk(t) for k=1 ... n where dk(t) represents components of the projected displacements on the i-th principle axes at time t, and k is an integer from 1 to n, where n is the number of displacement samples in the sliding window. (The window size can be configured to have an initial value that can be relatively close to the expected period of motion plus a margin, and can be updated iteratively as described further herein.) Further, plot 404 represents ak*dk(t) for k=1 ... n where ak=+1 or −1, and plot 406 represents D(t) where D(t) represents the maximally combined series.

In order to count repetitions of the motion of a user, the disclosed systems can determine the combination of projected displacements that maximize the projected displacements from the principle axes. The disclosed systems can perform this by determining all linear combinations of the projected displacements. Mathematically, this can be described as maximizing the time-dependent vector D(t), where D(t)=a1*d1 (t)+a2*d2(t)+ ... + an*dn(t) where ak=+1 or −1, and where $d_i$ represents components of the projected displacements on the i-th principle axes. The disclosed systems can determine the (a1, ... , an) coefficients where the sum(D2(t)) for all t is maximized. As noted, the disclosed systems can be configured to use any other suitable objective function (e.g., L1/L2 norms, etc.).

In another embodiment, to count the repetitions of a given motion, the disclosed systems can determine the number of zero crossings of a given principle axis associated with D(t). In some aspects, the zero-crossing can include a point where the sign of a mathematical function changes (e.g., from positive to negative) as represented by an intercept of the axis (zero value) in the graph of the function. In particular, the disclosed systems can identify a repetition as having occurred when a directional pair occurs. In another embodiment, the disclosed systems can determine a threshold in which multiple zero crossings of a given principle axis is counted as one zero crossing in order to reduce overcounting the repetitions that are not fully formed, and can be determined by observing deviations from the zero crossing in multiple measurements and comparing the magnitude of such deviations with a predetermined threshold. Such repetitions can correspond to motions by the user which are not fully executed (e.g., a jumping jack in which the user's jump height falls below a predetermined threshold percentage of the user's average jump height, etc.).

Figure 5:
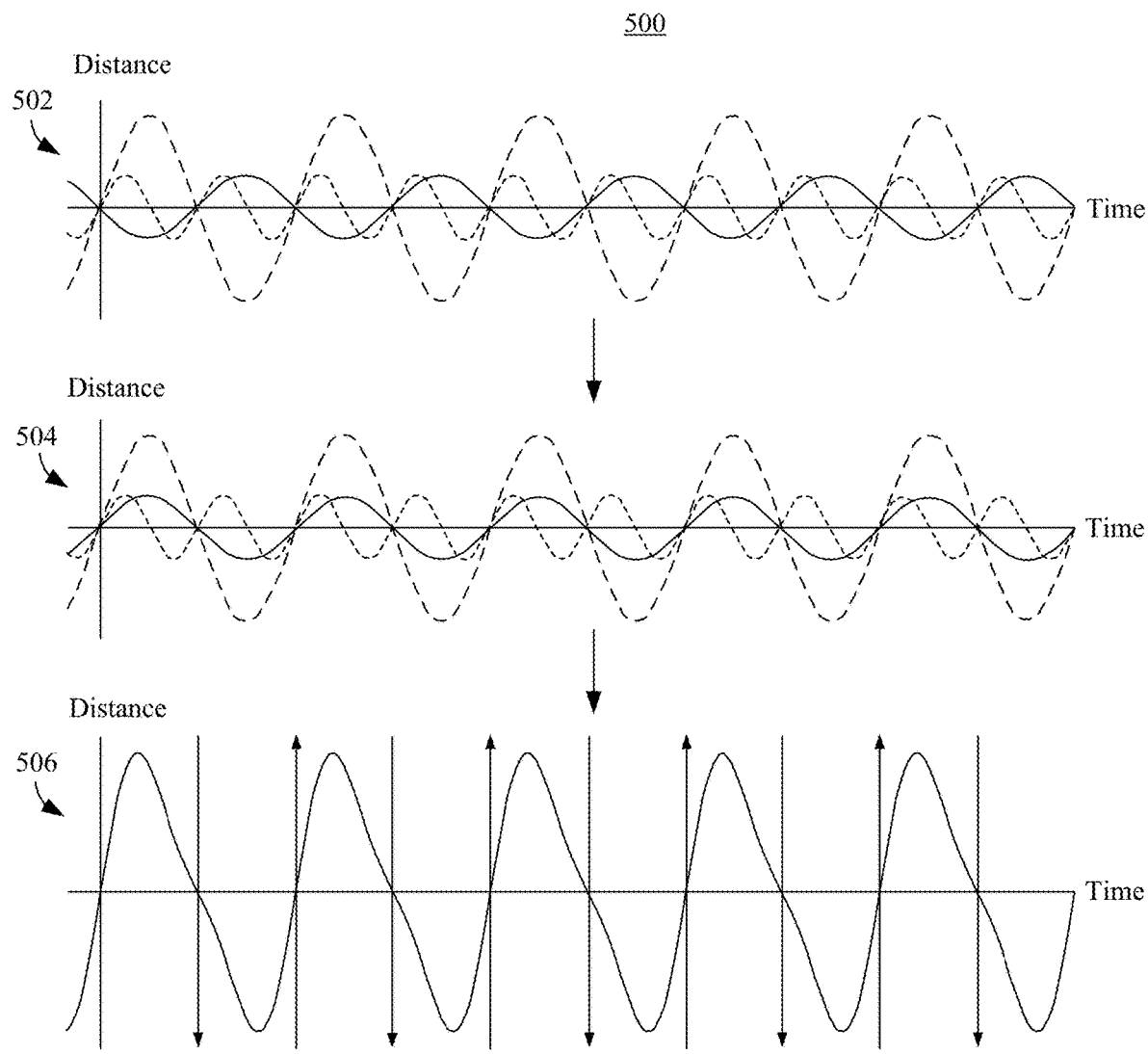
FIG. 5 again shows a flow of how multiple (e.g., three, in this case) distance-time series can be maximally combined, in accordance with example embodiments of the disclosure.

FIG. 5 again shows a diagram similar to that of FIG. 4, above. In particular, FIG. 5 shows a diagram 500 associated with a PCA of common motions undertaken by a user at the same time, including a portion of the diagram that represents the maximized projected displacements from a representative principle axis as per the technique described above. In some aspects, plot 502 represents dk(t) for k=1 ... n, plot 504 represents ak*dk(t) for k=1 ... n, and plot 506 represents D(t). Moreover, as will be further described in connection with diagram 500, debouncing can refer to multiple crossings, and bouncing within a predetermined band can be counted as one crossing for the purposes of repetition counting, thereby increasing the accuracy of motion characterization by the disclosed systems.

In another embodiment, the disclosed systems can determine the debouncing by performing a debouncing process. In particular, the disclosed systems can determine that a deviation from a first zero crossing and another deviation from a second zero crossing having a difference in magnitude below a predetermined threshold have a same zero crossing. In some embodiments, the disclosed systems can execute some operations for each updated video frame added to the video of the activity; accordingly, the disclosed systems can determine an updated set of zero crossings for the updated video frame.

In some case, the determined set of zero crossings can include duplicates of some of the previously determined existing zero crossings; accordingly, the disclosed systems can be configured to add only the non-duplicated zero crossings to the existing zero crossings. In another aspect, the deduplication process can begin processing with the first of the newly determined zero crossings, and can identify the newly determined zero crossings with a zero crossing in the existing set that is closest in time but has a time difference within a predetermined threshold. If the disclosed systems determine that the zero crossings match, the next zero crossing in the newly discovered set can be identified with the next zero crossing in the existing set, etc., until the disclosed systems reach the end of either set of zero crossings. If there are any remaining, unidentified zero crossings in the newly discovered set, those zero crossings can be considered as non-duplicates and can be appended to the end of the existing set at the end of the process.

Figure 6:
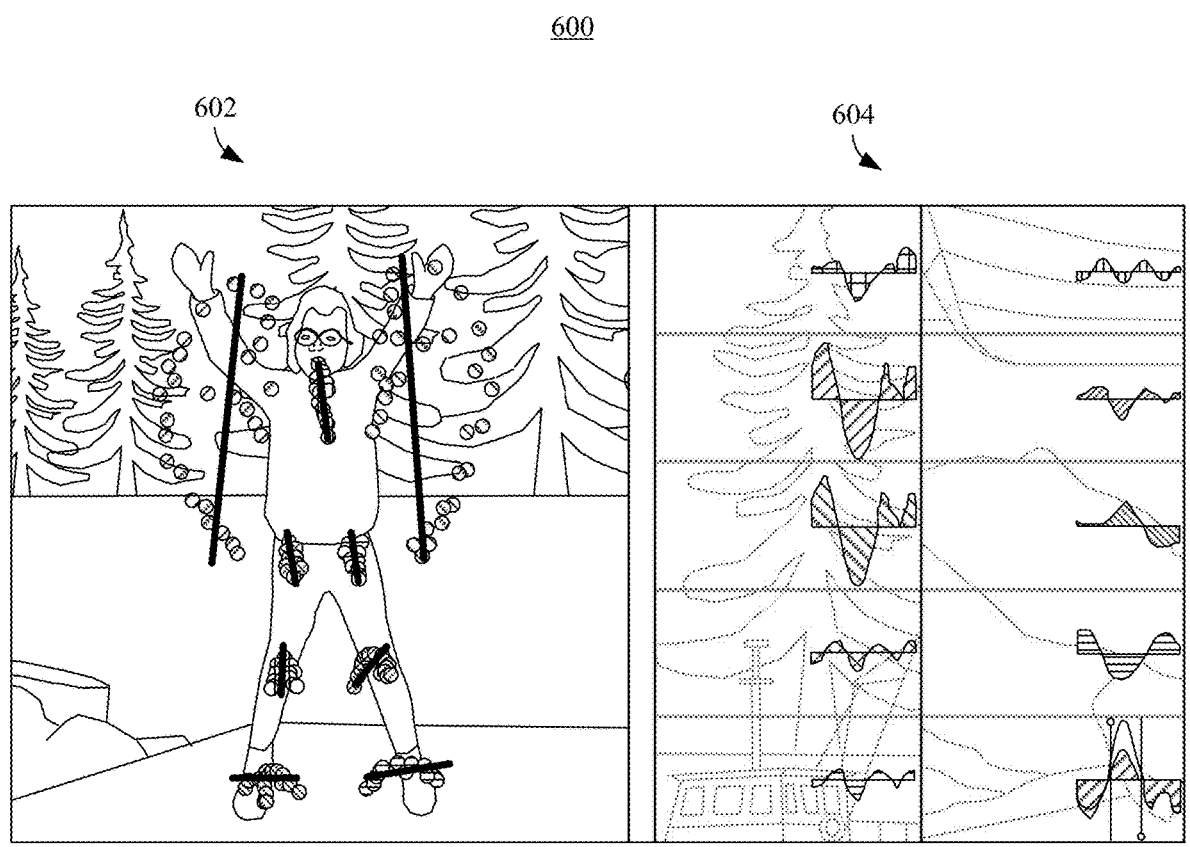
FIG. 6 shows a similar diagram as FIG. 2 of a user that is performing a motion that can be tracked and the projected displacement over time of points associated with each landmark tracked, in accordance with example embodiments of the disclosure.

FIG. 6 shows a similar diagram 600 as diagram 200 of FIG. 2 in which a user that is performing a motion that can be tracked, in accordance with example embodiments of the disclosure. As noted, the motion of the user (e.g., see diagram 602) can have a repetitive nature (e.g., jumping jacks); further motion can be periodic for a predetermined duration (e.g., 2 seconds, 5 seconds, 1 minute, 5 minutes, etc.). In some embodiments, for different portions of the user's body (e.g., arms, legs, feet, torso, etc.) the disclosed systems can generate different plots based on these motions. In particular, the disclosed systems can generate plots as shown in diagram 604 which can be similar to the plots shown in diagram 500 of FIG. 5 and reflecting a PCA of a motion undertaken by the user at different times having the maximized projected displacements from a representative principle axis. Further, as described below, each repetition of the motion by the user may generate a slightly different plot, as the body of the user is not necessarily in the exact same position in 3D-space while making the repetitive motions. Accordingly, in another embodiment, the disclosed systems can be configured to perform a stitching operation to deduplicate older detections of a given zero crossing in previous frames of the video that are continuously redetected for a duration of time, for example, to prevent overcounting the repetitions associated with a particular motion performed by a given user. The stitching operation process can include the disclosed systems determining unique pairs of matching zero crossings between the redetected zero crossings and older detections, sequentially from the beginning of the redetected zero crossings, and removing the matching ones from the redetected zero crossings. Further, the disclosed systems can match the zero crossings based on the zero crossings' polarity and time.

Figure 7:
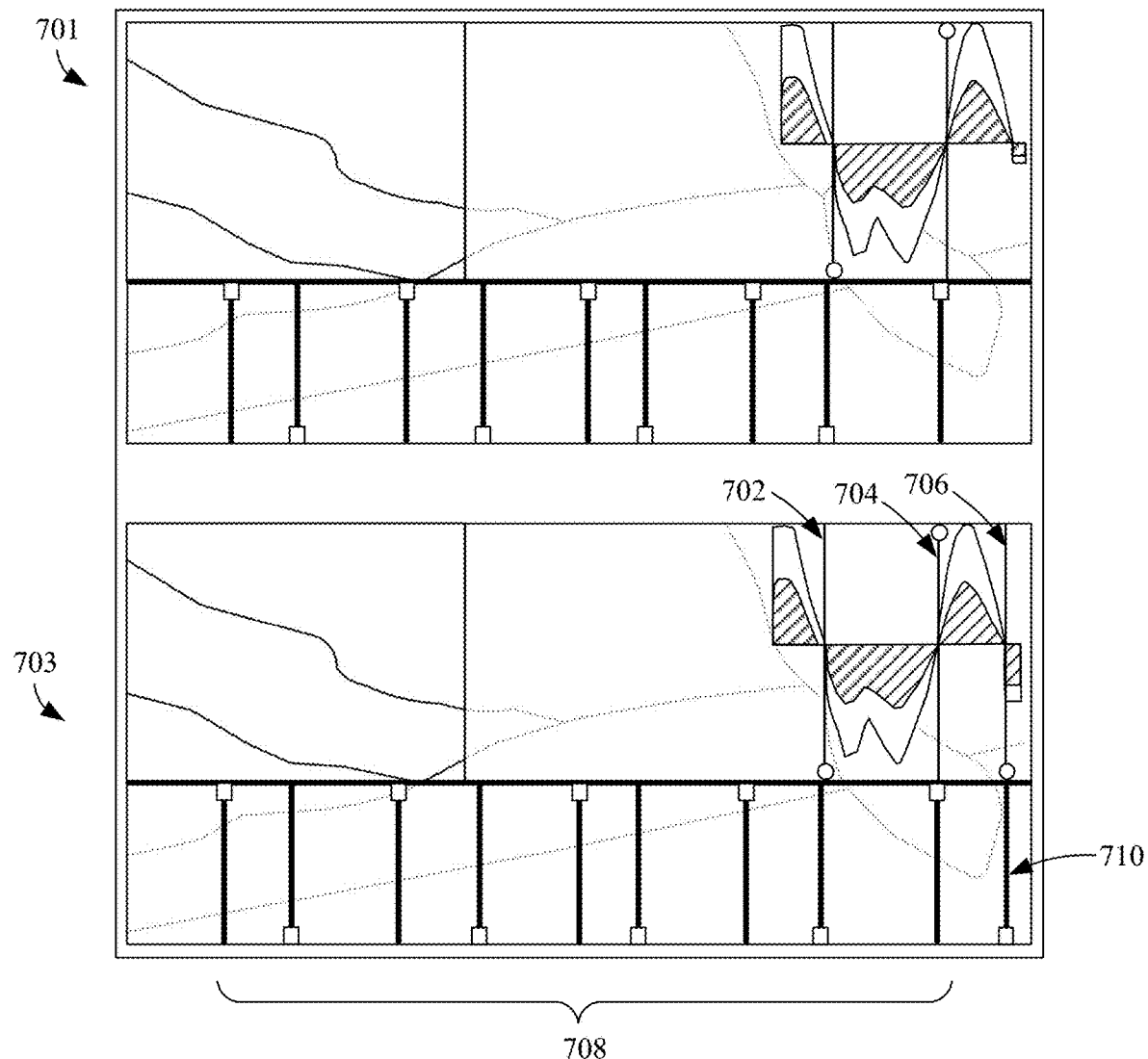
FIG. 7 shows a diagram of two different plots of the combined single time series in FIG. 5, at slightly different times, in accordance with example embodiments of the disclosure.

Further, FIG. 7 shows plots 701 and 703 of the combined single time series data of diagram 500 of FIG. 5 (reflecting a PCA of a motion undertaken by the user at different times having the maximized projected displacements from a representative principle axis), at a slightly different time, in accordance with example embodiments of the disclosure. In particular, the first plot 701 represents the combined single time series at a first (slightly earlier) time, while the second plot 703 represents the same plot at a second (slightly later) time. Moreover, the second plot 703 of FIG. 7 represents the combined single time series at a bit later in time (e.g., a few frames, a few seconds, etc.), when the first two zero-crossings 702 and 704 is deduplicated, and a new third zero-crossing 706 is discovered. The disclosed systems can then add the new third zero-crossing 710 to the sequence of all previously detected zero crossings 708. The disclosed systems can repeat the stitching operation described herein at every frame such that the process of discovering the third zero-crossing 706 when the first two zero-crossings 702 and 704 is deduplicated can occur at run time.

In particular, the disclosed systems can determine the deduplication by performing at least some of the following operations: generating a distance time series data vector based on the projection of the points onto the principle component axes; generating a second time series data based on a determination of the maxima of the distance time series data vector; and determining zero crossings of the second time series data; and determining a number of zero-crossing pairs having associated opposing directions based on the zero crossings. In some embodiments, the generating of a second time series data based on maxima of the distance time series data vector can further include maximizing a function including a linear combination of components of the distance time series data vector. In some embodiments, after determining the second time series, the disclosed systems can be configured to discard data in the second time series that is older than a predetermined number of the latest zero crossings. Further, the disclosed systems can ensure that the amount of discarded data also satisfies the condition that no more data is discarded than needed to keep a minimum amount of time series data. Further, the resulting shorter time series data can be normalized by magnitude, and optionally, the data can be bias corrected, before the disclosed systems proceed to find zero crossings in the time series data.

Figure 8:
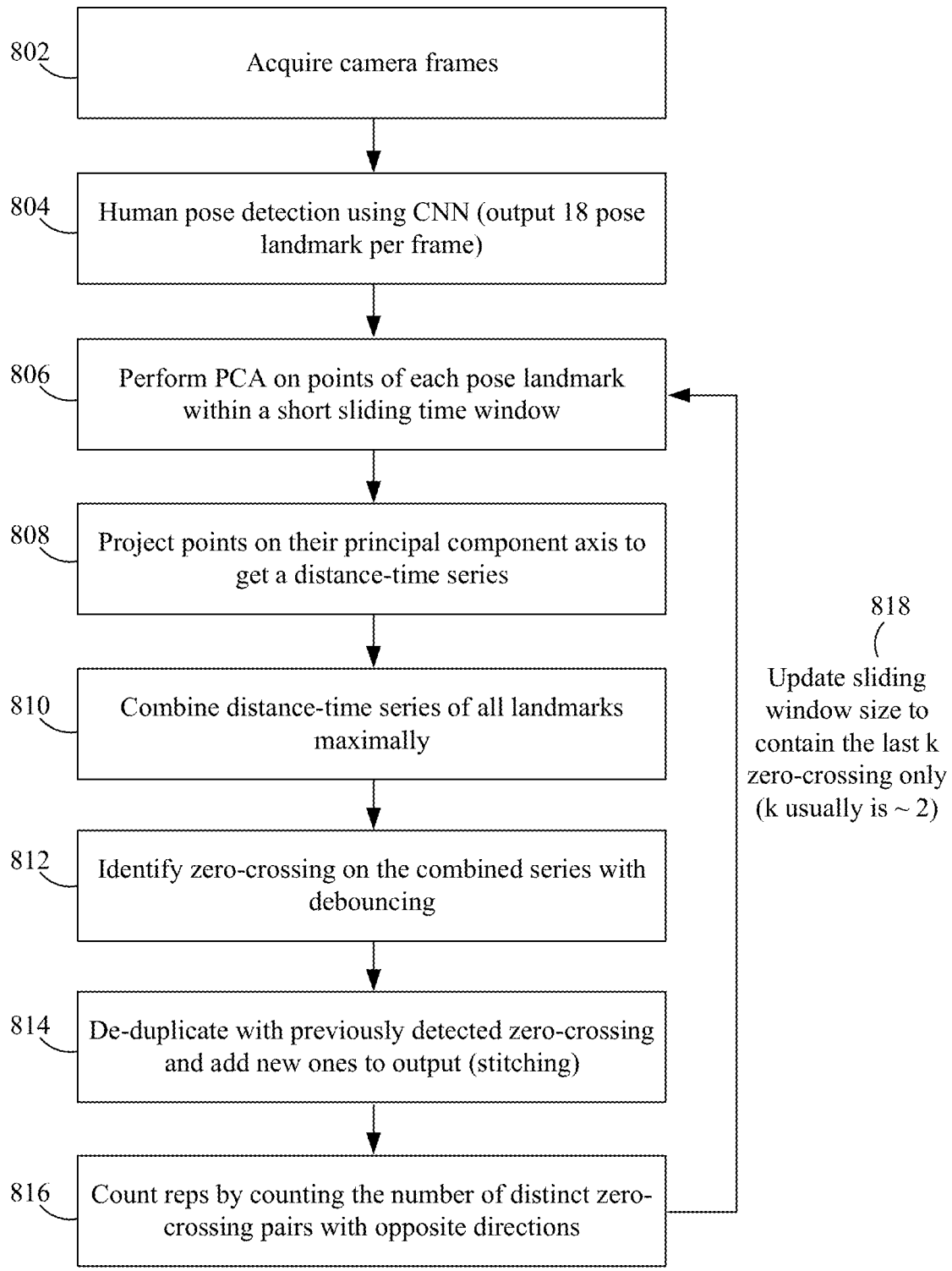
FIG. 8 shows an example flow chart illustrating representative operations for generic repetition counting through pose estimation, in accordance with example embodiments of the disclosure.

FIG. 8 shows an example flow chart illustrating representative operations for generic repetition counting through pose estimation, in accordance with example embodiments of the disclosure. In particular, the disclosed systems can perform one or more of the operations described below to perform the motion detection and repetitions. At step 802, the disclosed systems can first acquire camera frames. In some embodiments, the camera can include a camera associated with mobile device. At step 804, the disclosed systems can perform human pose detection, for example, using a CNN. In another embodiment, the disclosed systems can use the CNN to output about 18 pose landmarks per frame (or any number of pose landmarks). At step 806, the disclosed systems can then perform PCA on points of each pose landmark. In another embodiment, the pose landmarks can be within a short sliding time window. At step 808, the disclosed systems can project the points onto their principal component axes to get a number of distance-time series. At step 810, the disclosed systems can then combine the distance-time series of all landmarks maximally. Further, at step 812, the disclosed systems can identify zero-crossings on the combined series while performing debouncing to reduce overcounting. In some embodiments, the combined series can also be normalized by magnitude, and optionally bias corrected, before the disclosed systems proceed to finding zero crossings in the combined series. At step 814, the disclosed systems can de-duplicate the zero-crossings with previously detected zero-crossings and add the new zero crossings to the output via a stitching operation. At step 816, the disclosed systems can count repetitions by counting the number of distinct zero-crossing pairs having opposite directions. At step 818, the disclosed systems can then update a sliding window size to contain the last k zero-crossings (k usually is about 2). The process can be repeated in time while the camera is capturing frames of the video of the user performing the motions.

In summary, many exercises can include repetitive body and limb movements. The disclosed systems can be configured to count the repetitions of such movements in real time by analyzing the video frames from a camera (e.g., a camera of a mobile device). Further, the disclosed systems do not rely upon a priori knowledge of what the motion the person is performing or attempting to perform. Further, the disclosed systems do not depend on estimating what activity the person is performing or what motion the person is performing as part of that activity in order to count the repetitive motions. It is understood that the disclosed embodiments should not be limited to the type of motions we can count, as long as it consists of repetitive motions. For example, the motion can be associated with a sport, an exercise, a rehabilitation process, and/or the like. Further, the motion does not necessarily have to be associated with a person but can be described for any object that moves in a repetitive manner. Further, as noted, the counting results can be provided in real time or near real time.

In another embodiment, the disclosed systems can further classify the repetitive movements in addition to counting the repetitive movements. In some embodiments, the principal component of points associated with each landmark constitute to each counted repetition can be considered as being characteristic of type of the repetitive motion.

Figure 9:
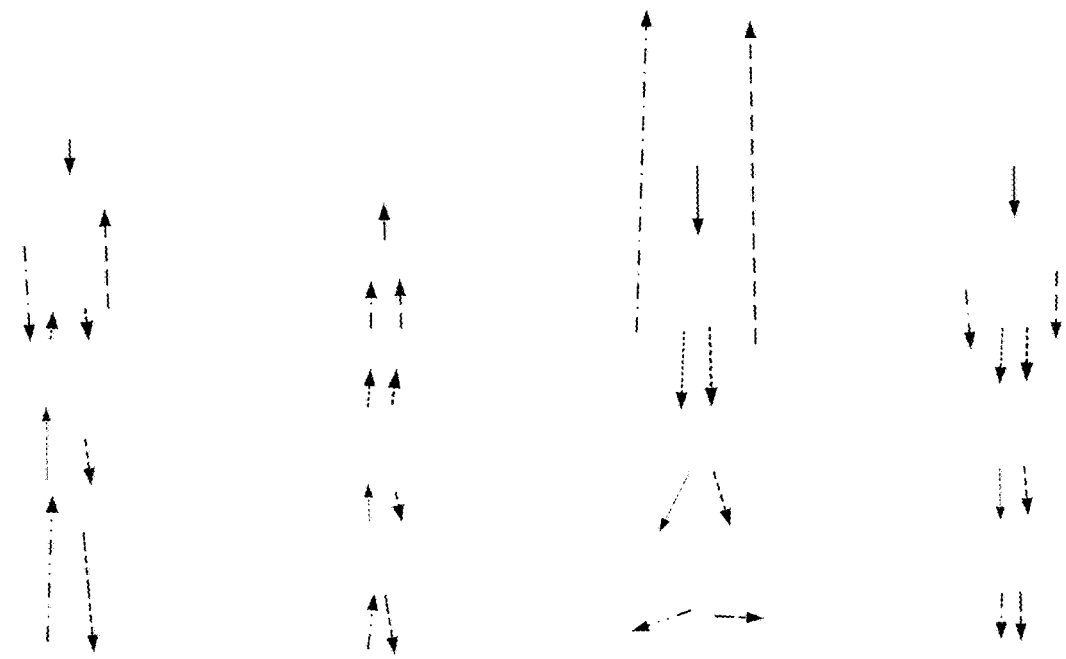
FIG. 9 shows a diagram of the disclosed systems generating classifications associated with motions such as high knee, jogging in place, jumping jack, jump rope, lunge, squat, squat jump, combinations thereof, and/or the like, based on patterns associated with the principle components of landmarks associated with a given motion, in accordance with example embodiments of the disclosure.
Figure 9:
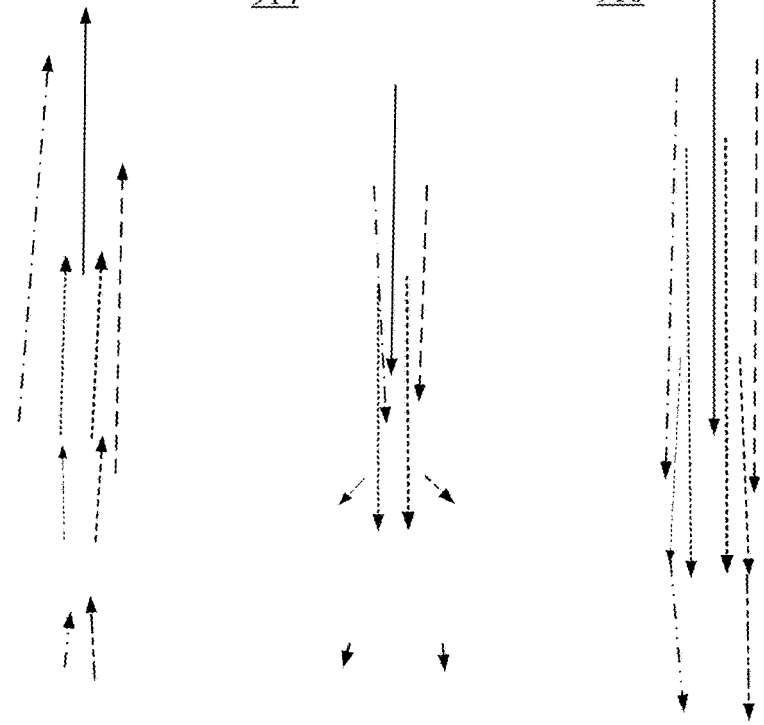

FIG. 9 shows a diagram 900 depicting the disclosed systems generating classifications associated with motions, in accordance with example embodiments of the disclosure. In particular, the motions can include, but not be limited to, high knee 902, jogging in place 904, jumping jack 906, jump rope 908, lunge 912, squat 914, squat jump 916, combinations thereof, and/or the like, based on patterns associated with the principle components of landmarks associated with a given motion. Accordingly, to classify repetitions, for each landmark, the disclosed systems can encode the principal component of each landmark as two points p1->p2, such that the distance between the two points distance (p1, p2)=square root (eigenvector). (The disclosed systems can, alternatively or additionally, encode the principle components of each landmark as one two-dimensional point and/or a two-dimensional direction vector.) This process can result in 4n numbers where n is the number of landmarks used. Further, the disclosed systems can also include 1 extra number which can represent the duration of the repetition. In another embodiment, the disclosed systems can use these 4n+1 numbers to train a machine learning algorithm (e.g., a fully connected multi-layer neural network) to classify the repetitions into any number of known types.

Figure 10:
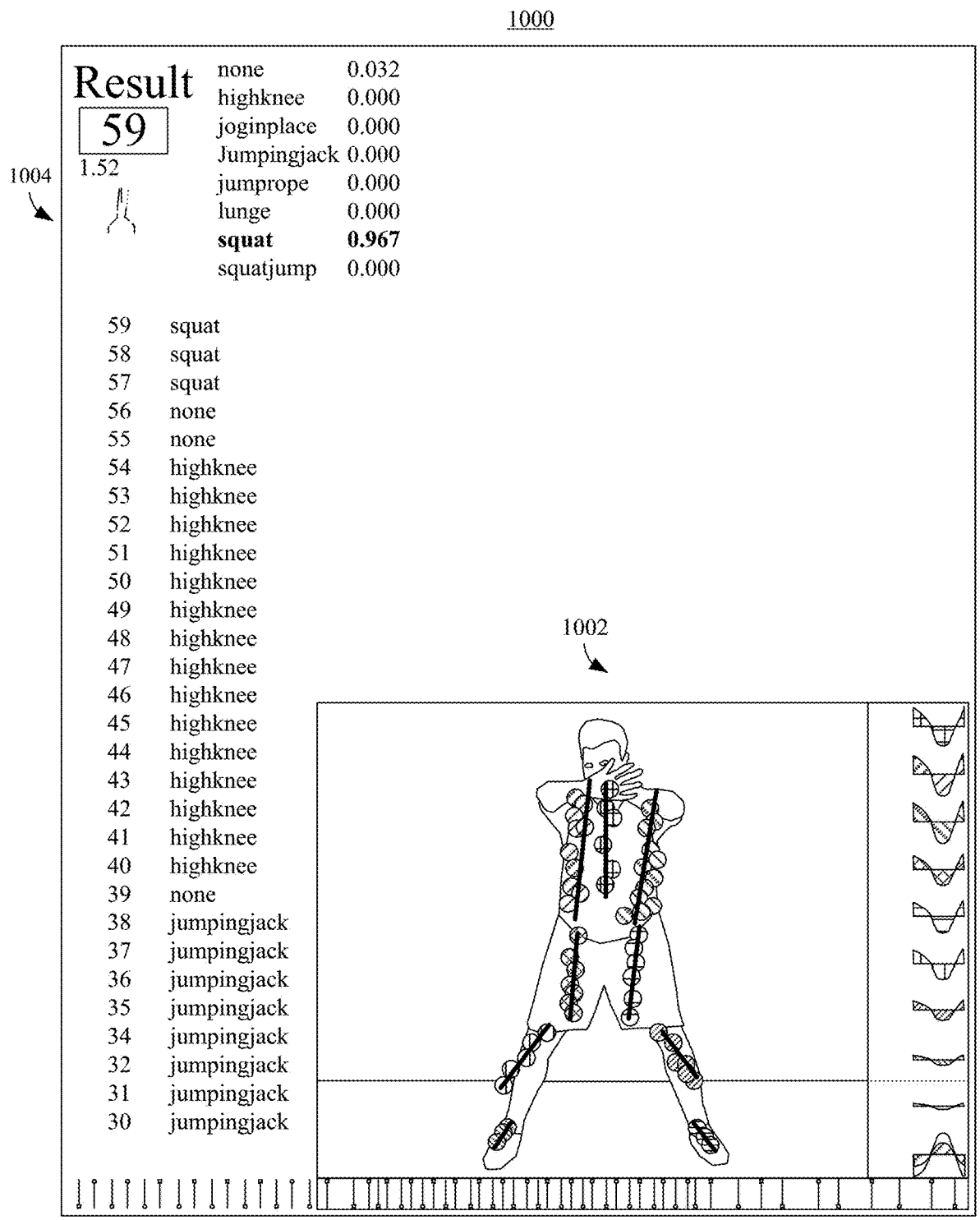
FIG. 10 shows a diagram of a user performing multiple different types of movements (e.g., a squat, a high knee, and a jumping jack), showing the system can detect, classify, and count the different movements and the total number of movements accordingly, in accordance with example embodiments of the disclosure.

FIG. 10 shows a diagram 1000 in which a user 1002 can perform multiple different types of movements (e.g., a squat and a high knee and a jumping jack) and the system can detect, classify, and count the different movements and the total number of movements and depict them as shown in graphical user interface (GUI) 1004, in accordance with example embodiments of the disclosure. This detection, classification, and counting of the different movements and the total number of movements can be used, for example, as part of a training session, a competition, a sport, combinations thereof, and/or the like.

NEX Platform

For context, FIG. 11 is a schematic diagram illustrating functionalities provided by an extended NEX platform 1100, according to one embodiment of the present invention. Discussions within the present application have emphasized on the real-time analytics 1170 of a fitness and/or training session, where live motions 1120 are processed in real-time by NEX computing device 1150. In some embodiments, NEX platform 1100 may capture activities 1130 and provide later replay 1180 with analytics. Furthermore, NEX platform 1100 may receive on-demand capture and recordings 1110 of past activities, such as training and/or fitness sessions, for post-processing within NEX computing device 1150, and/or instant or on-demand replay and content sharing 1160.

Although NEX computing device 1150 as shown in FIG. 11 serves as the core for NEX platform 1100, in some embodiments, NEX platform 1100 may be networked among multiple user devices, where a NEX server may be connected to multiple camera-enabled user computing devices, each used to capture user or activity data, and for providing analytics. Such video and/or analytics data may be uploaded to the NEX server, which in turn may store and facilitate sharing of such data among individual players/users, or participants of an online analytics and training community.

Implementation Using Computer Program Products, Methods, and Computing Entities

Exemplary System Architecture

An exemplary embodiment of the present disclosure may include one or more user computing entities 1200, one or more networks, and one or more server or management computing entities 1300, as shown in FIGS. 12 and 13. Each of these components, entities, devices, systems, and similar words used herein interchangeably may be in direct or indirect communication with, for example, one another over the same or different wired or wireless networks. Additionally, while FIGS. 12 and 13 illustrate the various system entities as separate, standalone entities, the various embodiments are not limited to this particular architecture.

Exemplary User Computing Entity

FIG. 12 is an exemplary schematic diagram of a user computing device 1200 for implementing the disclosed systems for repetitive motion detection and characterization, according to exemplary embodiments of the present invention. A user operates a user computing device 1200 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 1200 may be a mobile device, and may be operated by a user participating in an interactive physical training activity. On the other hand, a NEX server may be implemented according to the exemplary schematic diagram shown in FIG. 13, possibly in the cloud, and possibly with logically or physically distributed architectures.

As shown in FIG. 12, the user computing entity 1200 may include an antenna 1270, a radio transceiver 1220, and a processing unit 1210 that provides signals to and receives signals from the transceiver. The signals provided to and received from the transceiver may include signaling information in accordance with air interface standards of applicable wireless systems. In this regard, the user computing entity 1200 may be capable of operating with one or more air interface standards, communication protocols, modulation types, and access types. More particularly, the user computing entity 1200 may operate in accordance with any of a number of wireless communication standards and protocols. In some embodiments, user computing entity 1200 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 1200 may operate in accordance with multiple wired communication standards and protocols, via a network and communication interface 1222.

Via these communication standards and protocols, the user computing entity 1200 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1200 can also download changes, add-ons, and updates, for instance, to its firmware, software (e.g., including executable instructions, applications, program modules), and operating system.

In some implementations, processing unit 1210 may be embodied in several different ways. For example, processing unit 1210 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1210 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1210 may be configured for a particular use or configured to execute instructions stored in volatile or non-volatile media or otherwise accessible to the processing unit. As such, whether configured by hardware or computer program products, or by a combination thereof, processing unit 1210 may be capable of performing steps or operations according to embodiments of the present invention when configured accordingly.

In some embodiments, processing unit 1210 may comprise a control unit 1212 and a dedicated arithmetic logic unit 1213 (ALU) to perform arithmetic and logic operations. In some embodiments, user computing entity 1200 may optionally comprise a graphics processing unit 1240 (GPU) for specialized image and video rendering tasks, and/or an artificial intelligence (AI) accelerator 1242, specialized for applications including artificial neural networks, machine vision, and machine learning. In some embodiments, processing unit 1210 may be coupled with GPU 1240 and/or AI accelerator 1242 to distribute and coordinate processing tasks.

In some embodiments, user computing entity 1200 may include a user interface, comprising an input interface 1250 and an output interface 1252, each coupled to processing unit 1210. User input interface 1250 may comprise any of a number of devices or interfaces allowing the user computing entity 1200 to receive data, such as a keypad (hard or soft), a touch display, a mic for voice/speech, and a camera for motion or posture interfaces. User output interface 1252 may comprise any of a number of devices or interfaces allowing user computing entity 1200 to provide information to a user, such as through the touch display, or a speaker for audio outputs. In some embodiments, output interface 1252 may connect user computing entity 1200 to an external loudspeaker or projector, for audio or visual output.

User computing entity 1200 may also include volatile and/or non-volatile storage or memory 1230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1214, application software 1216, data 1218, databases, database instances, database management systems, programs, program modules, scripts, source code, object code, byte code, compiled code, interpreted code, machine code, executable instructions, and/or the like to implement the functions of user computing entity 1200. As indicated, this may include a user application that is resident on the entity or accessible through a browser or other user interface for communicating with a management computing entity and/or various other computing entities.

In some embodiments, user computing entity 1200 may include location determining aspects, devices, modules, functionalities, and/or similar words used herein interchangeably. For example, user computing entity 1200 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1200 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In an interactive physical training session, a user computing entity 1200 may be deployed (e.g., installed; configured; accepted; installed and accepted; configured and accepted; installed, configured, and accepted; or the like) in a training area that includes players and/or game equipment. In some embodiments, at least one input device on user computing entity 1200 may collect or may be configured to collect information (e.g., data, metadata, and/or signaling) indicative of operational features of the training area and/or equipment for analysis by processing unit 1210. For example, computer vision algorithms as implemented on user computer entity 1200 may be configured to detect the location of court lines, field boundaries, one or more balls, or goal posts in an input video as captured by an input camera device.

In some embodiments, a system for repetitive motion detection and characterization may include at least one user computing device such as a mobile computing device and optionally a mounting apparatus for the at least one mobile computing device. The mounting apparatus may be a tripod or a kickstand, and may mount the electronic device with a camera of the user computing device positioned to monitor a training area. In some embodiments, the user computing device may be hand-held or put on the ground leaning against certain articles such as a water bottle. In some embodiments, the system for repetitive motion detection and characterization further comprises a sound device, for example, earbuds (e.g., wireless earbuds) or a speaker system (e.g., a public address (PA) system) coupled to the at least one user computing device. The sound device may serve to provide instruction and feedback regarding a training session to the user. In some embodiments, the system optionally comprises an optical device such as a projector, a projection lamp, a laser pointing system, a jumbotron, a television screen, or the like, that can facilitate an interactive training session. For example, a laser pointing system may point to a location in the training area to direct the user to position himself or herself, or it may point to a location in a display of the training video as the visual cue, to direct the user to perform a desired set of physical movements.

In some embodiments, user computing entity 1200 may communicate to external devices like other smartphones and/or access points to receive information such as software or firmware, or to send information (e.g., training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different areas. In some embodiments, the user computing devices may use a network interface such as 1222 to communicate with various other computing entities, such as by communicating data, content, information, and/or similar terms used herein interchangeably that can be transmitted, received, operated on, processed, displayed, stored, and/or the like.

In some embodiments, data such as training statistics, scores, and videos may be uploaded by one or more user computing devices to a server such as shown in FIG. 13 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate an interactive session. In some embodiments, audio may be used to (i) direct users to particular positions on training areas (with further audio feedback to help the users locate themselves more accurately), (ii) inform users about a motion or action that a user needs to do as part of the training (e.g., shoot a ball at a basket, perform a back flip, perform an exercise such as pushups, and the like), (iii) provide feedback to the user (e.g., to inform them if the users are making a wrong move, running out of time, have successfully completed a given drill, or achieved a particular score), or (iv) report on the progress of the session (statistics, leaderboard, and the like). In some embodiments, speech recognition and corresponding responses (e.g., audio, visual, textual, etc. responses) may also be used to facilitate the session by allowing users to set options, correct mistakes, or start or stop the session.

In some embodiments, artificial intelligence-based computer vision algorithms may be used to perform at least one of the following: (i) ensure that users are located where they should be, (ii) determine when/if users successfully complete a task, (iii) rank the quality of users' motion/action, and (iv) award quality points or other attributes depending on the nature of the users' motion (v) detect and count repetitive motions of a user (e.g., jumping jacks, pushups, etc.).

In various embodiments, during the physical activities performed by users, the mobile computing device may not be on the user's person, and instructions may be given via a speaker or other remote devices connected to the mobile device. Further, computer vision algorithms may be used on the mobile device to guide and monitor the user being conducted within the mobile device camera's field of view. Accordingly, embodiments of devices described herein can employ artificial intelligence (AI) to facilitate automating one or more features of functionalities as described herein.

To provide for or aid in the numerous determinations (e.g., determine, ascertain, infer, calculate, predict, prognose, estimate, derive, forecast, detect, compute) of training settings, player postures and player analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example.

The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, training instructions and feedbacks to player may be generated from one or more analytics derived from user actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 13 is an exemplary schematic diagram of a management computing entity 1300, such as a NEX server, for implementing a system for repetitive motion detection and characterization, according to exemplary embodiments of the present invention. The terms computing entity, computer, entity, device, system, and/or similar words used herein interchangeably are explained in detail with reference to user computing entity 1200.

As indicated, in one embodiment, management computing entity 1300 may include one or more network or communications interface 1320 for communicating with various computing entities, such as by communicating data, content, information, and/or similar terms used herein interchangeably that can be transmitted, received, operated on, processed, displayed, stored, and/or the like. For instance, management computing entity 1300 may communicate with the user computing device 1200 and/or a variety of other computing entities. Network or communications interface 1320 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1300 may be configured to communicate via wireless external communication networks using any of a variety of standards and protocols as discussed with reference to user computing device 1200.

As shown in FIG. 13, in one embodiment, management computing entity 1300 may include or be in communication with one or more processing unit 1310 (also referred to as processors, processing circuitry, processing element, and/or similar terms used herein interchangeably) that communicate with other elements within the management computing entity 1300. As will be understood, processing unit 1310 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1310 may be configured for a particular use or configured to execute instructions stored in volatile or non-volatile media 1330 and 1340. As such, whether configured by hardware or computer program products, or by a combination thereof, processing unit 1310 may be capable of performing steps or operations according to embodiments of the present disclosure when configured accordingly.

Although not shown explicitly, management computing entity 1300 may include or be in communication with one or more input elements, such as a keyboard, a mouse, a touch screen/display, a camera for motion and movement input, a mic for audio input, a joystick, and/or the like. Management computing entity 1300 may also include or be in communication with one or more output elements such as speaker, screen/display, and/or the like.

In various embodiments, one or more of the components of management computing entity 1300 may be located remotely from other management computing entity components, such as in a distributed system or in the cloud. Furthermore, one or more of the components may be combined and additional components performing functions described herein may be included in the management computing entity 1300.

Machine Vision and Machine Learning Modules

As described herein, embodiments of the present invention use one or more artificial intelligence, machine vision, and machine learning algorithms or modules for analyzing videos and facilitating repetitive motion detection and characterization. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks (CNNs) utilize the process of convolution to reduce the number of model parameters involved, while successfully capturing the spatial and temporal dependencies in an image.

Figure 14:
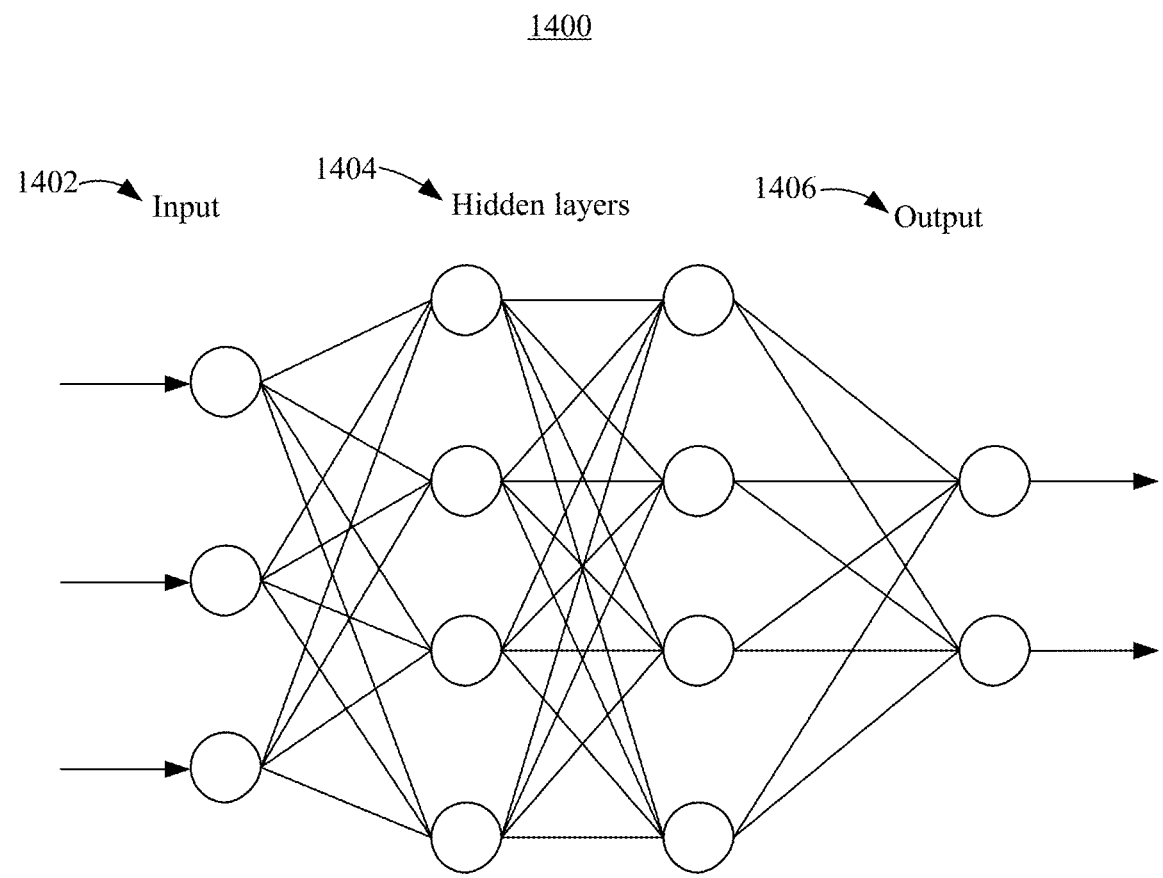
FIG. 14 shows an illustrative block diagram of a convolutional neural network (CNN) for image analysis, according to exemplary embodiments of the present invention.

More specifically, FIG. 14 shows an illustrative block diagram 1400 of a convolutional neural network (CNN) for image analysis and object recognition, according to exemplary embodiments of the present invention. This exemplary CNN module 1400 may be utilized for implementing various machine vision algorithms described herein. For example, it may be designed and trained to determine gestures and poses and other machine vision tasks required by the present invention, as would be recognized by one of ordinary skill in the art. An input layer 1402 is connected via a multiplicity of hidden layers 1404 to an output layer 1406. Input layer 1402 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 1406. Successive convolution-ReLU-pooling stages allow the successive extraction of low-level to high-level features, from edges, general shapes such as lines and circles, to specific shapes representing specific objects. FIG. 18A to 18E provide exemplary block diagrams of a detailed neural network design for pose estimation.

FIG. 14 shows only one illustrative CNN architecture that is within the scope of the present invention, but the present invention is not limited to the use of CNNs. Other machine vision algorithms are also within the scope of the present invention.

Illustrative Machine Learning Architectures

Figure 15:
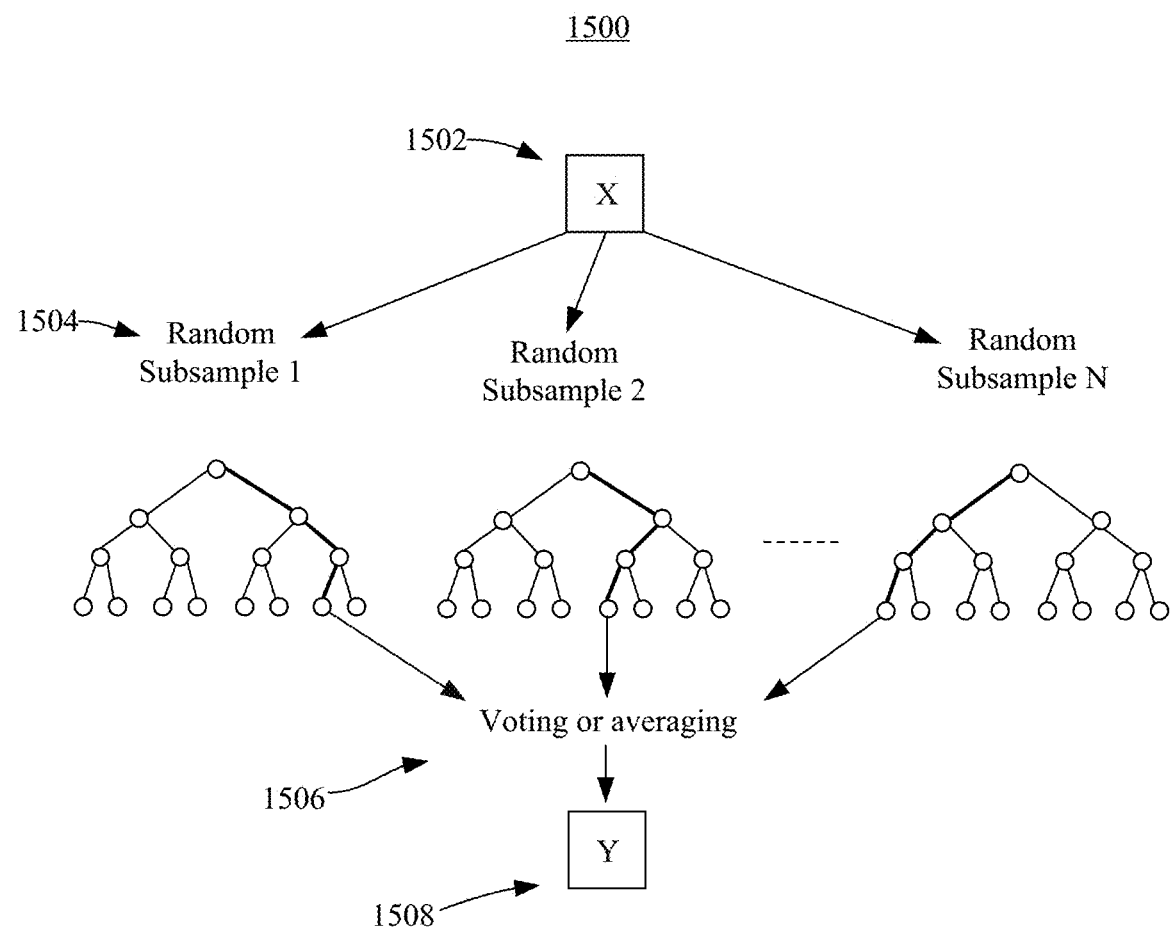
FIG. 15 shows an illustrative block diagram for a machine learning algorithm, according to exemplary embodiments of the present invention.

As stated herein, various exemplary machine vision and machine learning algorithms are within the scope of the present invention for performing object recognition, gesture recognition, pose estimation, and so forth. FIG. 15 shows an illustrative block diagram 1500 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 1504, each depending on the values of a random subset of a training data set 1502, the chances of overfitting to the training data set may be minimized. The decision tree predictors are voted or averaged at a decision step 1506 to obtain predictions 1508 of the random forest algorithm. For the task of object recognition, input 1502 to the machine learning algorithm may include feature values, while output 1508 may include predicted gestures and/or poses associated with a user. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object recognition, gesture recognition, and pose estimation.

Training Machine Learning Algorithms

Figure 16:
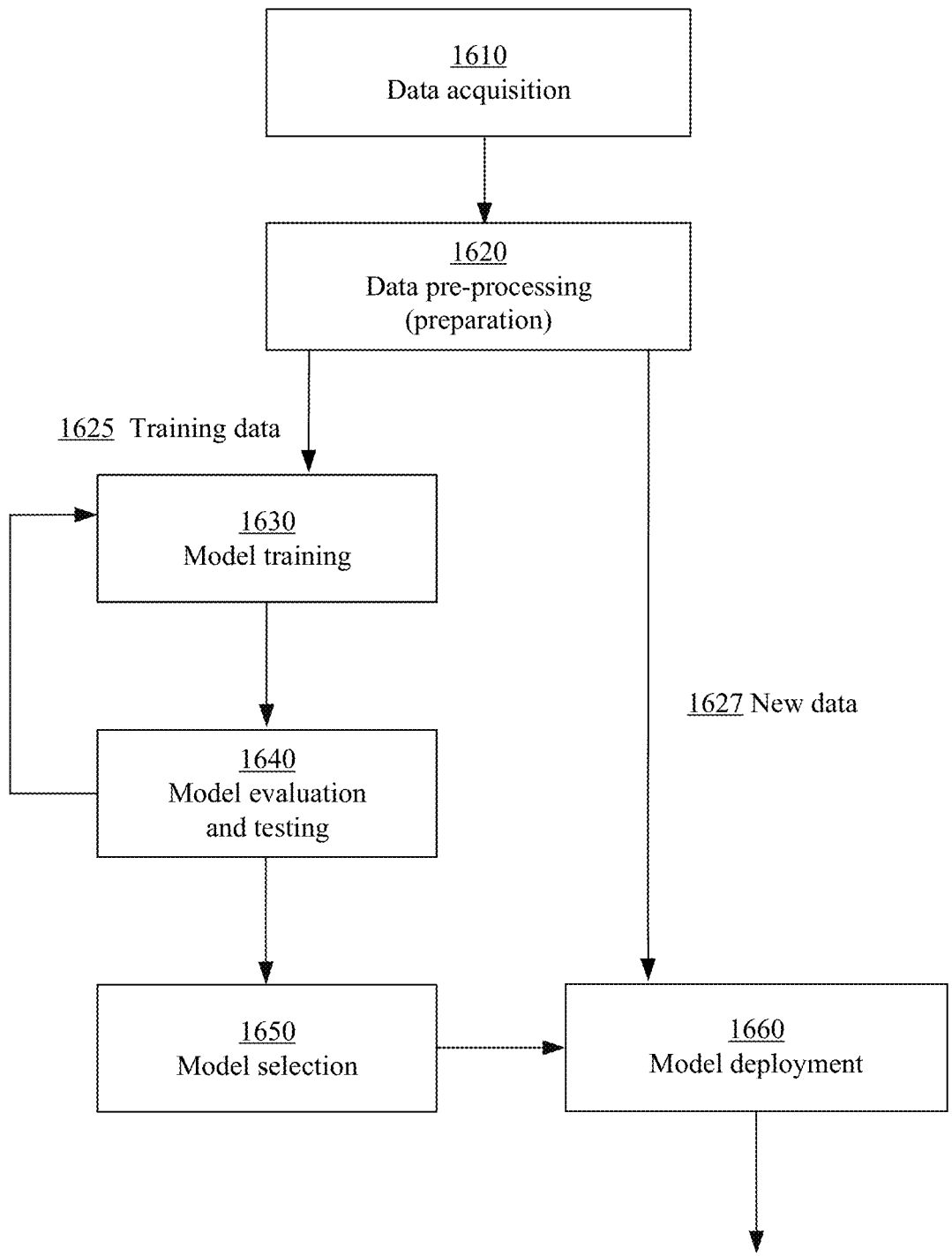
FIG. 16 shows an illustrative flow diagram for training a machine learning algorithm, according to exemplary embodiments of the present invention.

FIG. 16 shows an exemplary flow diagram 1600 for training a machine learning (ML) algorithm, which may be utilized in object recognition, pose estimation, and object flow construction, according to exemplary embodiments of the present invention;

The training process begins at step 1610 with data acquisition. At step 1620, acquired data are pre-processed, or prepared. At step 1630, a machine learning model is trained using training data 1625. At step 1640, the model is evaluated and tested, and further refinements to the model are fed back into step 1630. At step 1650, optimal model parameters are selected, for deployment at step 1660. New data 1627 may be used by the deployed model to make predictions.

A starting point for any machine learning method such as used by the machine learning component above is a documented dataset containing multiple instances of system inputs and correct outcomes (e.g., training data 1625). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. Thus, it would be understood by peoples of ordinary skill in the art that "training data" 1625 as referred to in this subsection are directed to data for training a machine vision algorithm or a machine learning algorithm, such as recorded training videos.

The quality of the output of the machine learning system output depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

Exemplary Convolutional Neural Networks (CNNs) for Pose Estimation

Figure 17A:
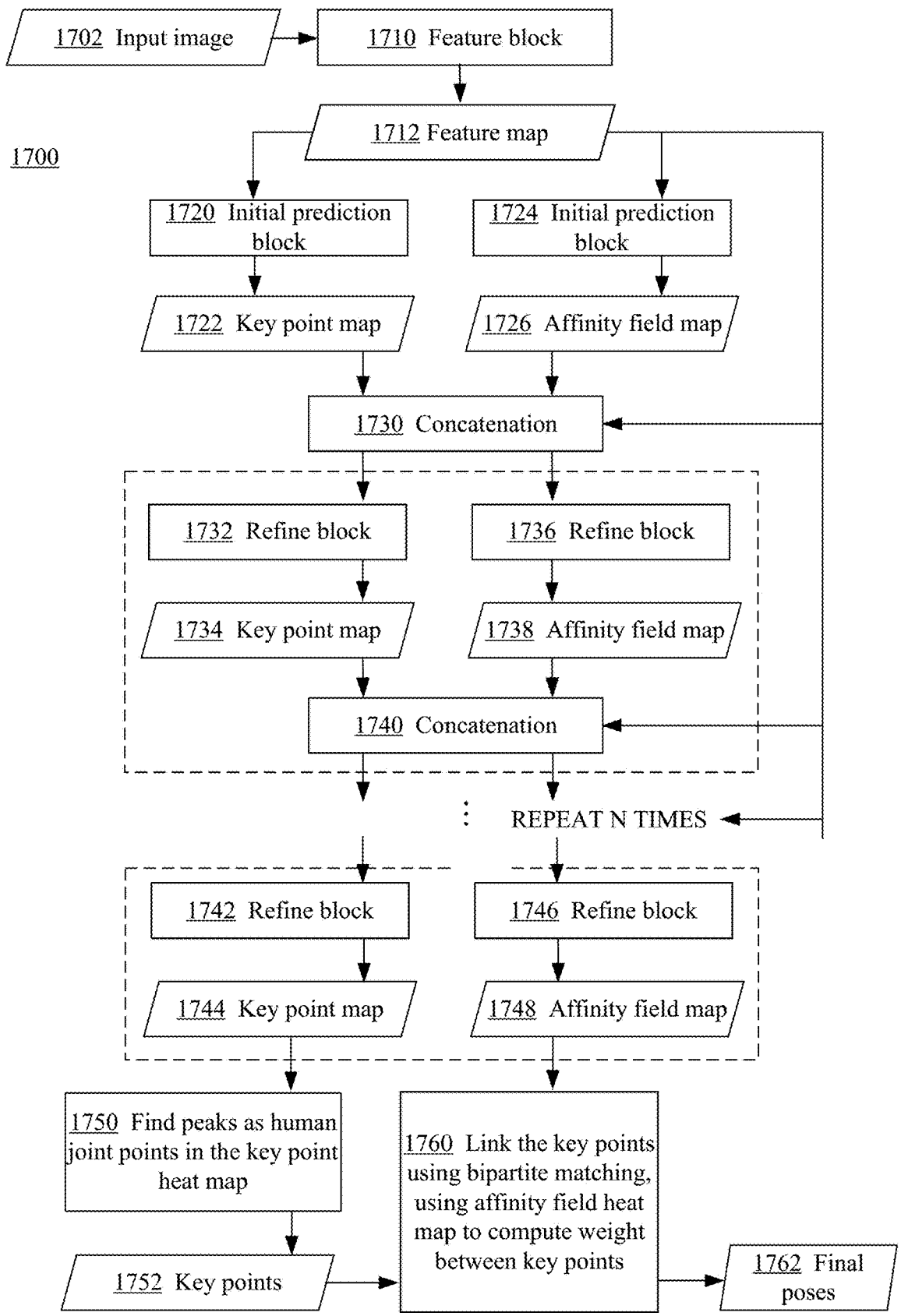
FIG. 17A is a block diagram of an exemplary neural network for pose estimation, according to exemplary embodiments of the present invention.

FIG. 17A is a block diagram 1700 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 17A performs the following steps to estimate the pose of one or more persons in an input image:
1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 1702 is first passed through a feature block 1710 to generate a feature map 1712. Initial prediction blocks 1720 and 1724 then extract a key point map 1722 and an affinity field map 1726, respectively. A concatenation operation 1730 is performed before further refinements are carried out in multiple iterations. For each stage of iteration, refine blocks such as 1732, 1736, 1742, and 1746 predict refined key point maps such as 1734 and 1744, and refined affinity field maps such as 1738 and 1748, respectively. Concatenation operations such as 1740 are performed to generate input for the next stage. A total of N refinements may be carried out, where N may be any positive integer. For example, N may equal to 5 in some embodiments of the present invention. After the last refinement stage, key point heat map 1744 is examined in step 1750 to find peaks as human joint points or key points 1752. Such key points may be linked in step 1760 to generate final poses 1762, by performing bipartite matching using affinity field heat map 1748 to compute weights between key points. In this illustrative example, key point map 1744 may comprise 18 channels, while affinity field map 1748 may comprise 34 channels.

FIG. 17B is a detailed block diagram illustrating an exemplary Feature Block 1710, according to some embodiments of the present invention. In this example, separable convolutional layers (SCL) are deployed with different kernel and stride sizes.

Correspondingly, FIG. 17C is a detailed block diagram illustrating an exemplary separable convolutional neural network layer 1770, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

FIG. 17D is a detailed block diagram illustrating an exemplary Initial Prediction Block 1720, according to some embodiments of the present invention; FIG. 17E is a detailed block diagram illustrating an exemplary Refine Block 1732, according to some embodiments of the present invention. Both comprise multiple separable convolutional layers having different kernel sizes. The input, output, and kernel sizes shown in FIGS. 17A and 17E are for illustrative purposes only, and other similar hyperparameter values may be used in various embodiments of the present invention.

In some implementations of the present invention, one or more of existing software modules may be utilized, including but not limited to, CoreML for CNN object and key point detection, SceneKit for rendering an AR court, and CoreMotion for understanding a mobile device's orientation.

Exemplary Convolutional Neural Networks (CNNs) for Object Detection

Figure 18A:
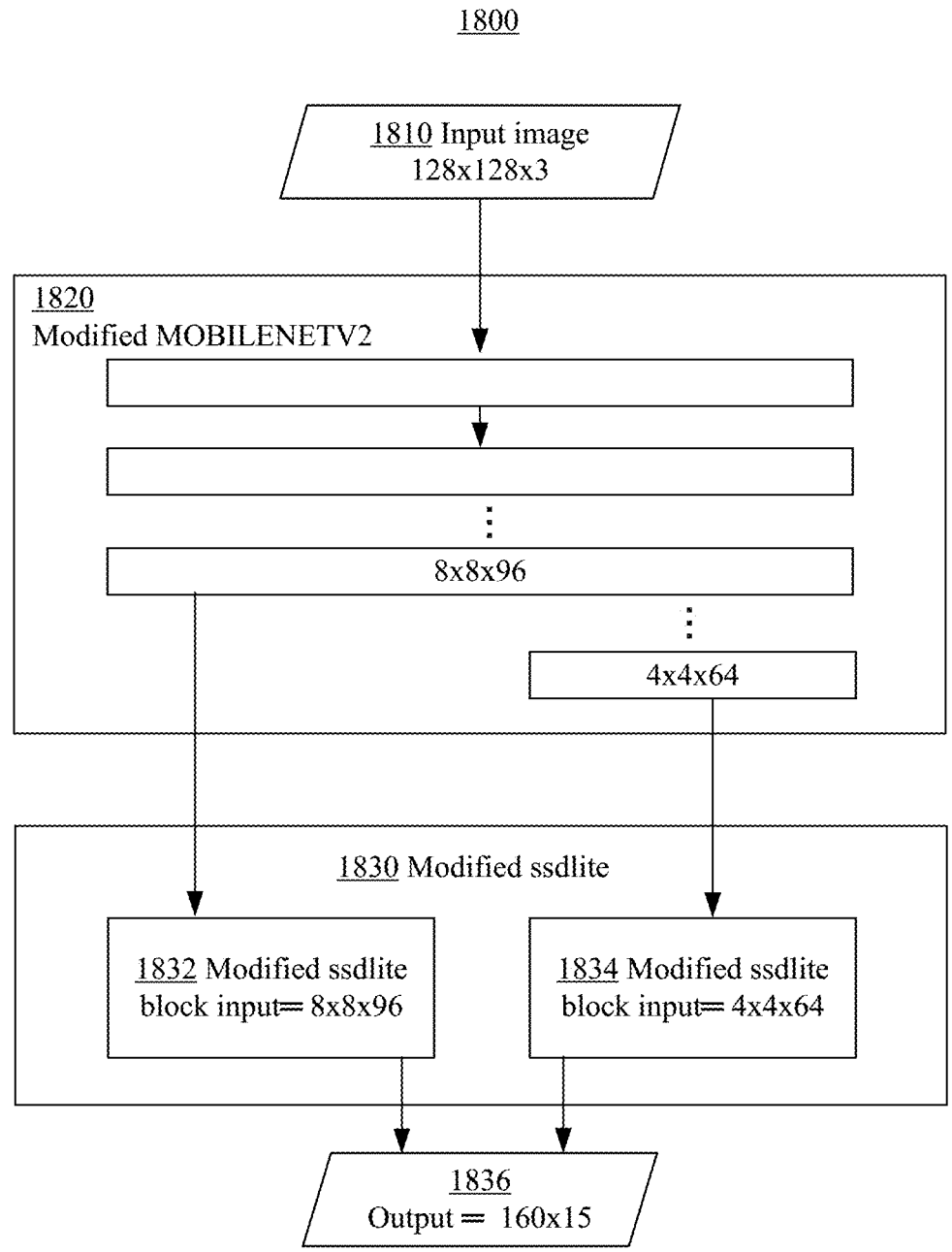
FIG. 18A is a block diagram of an exemplary neural network for object detection, according to one embodiment of the present invention.
Figure 18B:
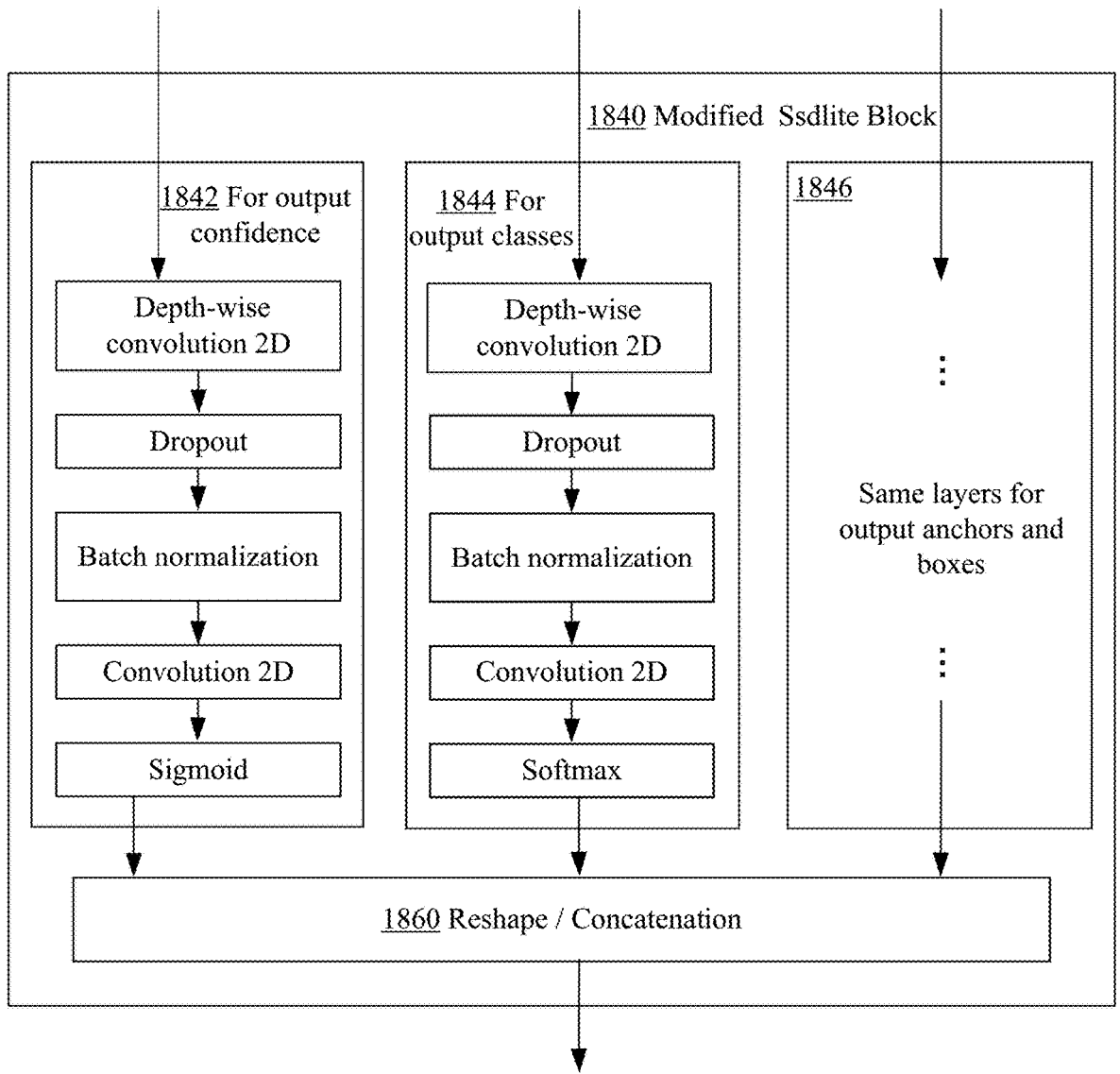
FIG. 18B is a detailed block diagram illustrating an exemplary Modified SSDLite Block of FIG. 18A, according to one embodiment of the present invention.

Many sports and corresponding performance training methods or techniques require additional equipment, such as a ball, hoop, marker cones, hurdles, batons, rackets, and the like. The detection of moving and/or static non-human objects from the training video is needed for some training activities to help determine player actions and player analytics. FIGS. 18A and 18B are respective block diagrams of an exemplary neural network for ball detection, according to one embodiment of the present invention. This object detector is presented for illustrative purposes only, and some embodiments of the present invention may utilize other computer vision system designs for object detection.

FIG. 18A is a block diagram 1800 of an exemplary neural network for ball detection, according to some embodiments of the present invention. In particular, FIG. 18A shows a CNN-based ball detector utilizing an optimized, modified MobileNetV2 framework as a feature extractor and a modified SSDLite framework for multi-scale object detection. An input image 1810 is first processed through a Modified MobileNetV2 block 1820, the output of which is processed through a Modified SSDLite module 1830 comprising two Modified SSDLite blocks 1832 and 1834, to generate output 1836. The input, output, and kernel sizes shown in FIGS. 18A and 18B are for illustrative purposes only, and other similar hyperparameter values may be used in various embodiments of the present invention.

MobileNetV2 is a convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 18A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific small input and ball detection goal.

FIG. 18B is a detailed block diagram illustrating an exemplary Modified SSDLite Block, such as 1832 or 1834 in FIG. 18A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 1840 shown in the exemplary embodiment of FIG. 18B further tailors and improves the accuracy of SSDLite by adding dropout layers.

More specifically, in Modified SSDLite Block 1840, parallel network blocks 1842, 1844, and 1846 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 1860 to generate output data.

For the ball detection task, two positive object classes may be considered: "ball" and "ball-in-hand." With conventional SSD or SSDLite framework, a single softmax function may be used to activate among background (e.g., no positive), and these two classes. By comparison, Modified SSDLite Block 1840 is designed so that it may classify a ball out of a background, but does not always classify between ball and ball-in-hand for some training data. Such a design takes into account several factors. First, ball and ball-in-hand are not always distinguishable, even for a human. In addition to motion blur, background and other objects such as leg, arm, other people in the background could look like a hand in terms of shape and/or color. Second, having a classifier distinguish between ball and ball-in-hand may not always be worthwhile and may even compromise detection accuracy since there are "gray areas" where an input may be classified either way. Instead, within Modified SSDLite Block 1840, a sigmoid function is used to produce confidence levels of whether a ball is present against a background, while a softmax function is used to classify between ball and ball-in-hand, or two output classes instead of three output classes for conventional SSD/SSDLite frames. As a further reduction to computational complexity, loss function and/or back propagation may be disabled if a given training case is in the "gray area."

Alternative Embodiments

In an embodiment, a method for determining a number of repetitive motions in a video is described. In some embodiments, the method can be implemented in real time or can be implemented incrementally. In some aspects, at least a portion of the operations below can be repeated for each video frame of the video. The method can include, but not be limited to, the operations of: determining a plurality of images from a video, wherein the images are segmented from at least one video frame of the video; perform a landmark detection process on a feature of the images to generate landmarks; determine principle component axes (e.g., first, second, third, or high order principle components) on points associated with a landmark of the landmarks and can optionally apply high/low/band-pass filtering to the points over the time domain; and determine at least one repetitive motion based on a pattern associated with a projection of the points onto the principle component axes (e.g., each principle axis that is employed). As noted, again, the disclosed systems can be configured to optionally apply high/low/band-pass filtering to the points over the time domain. In some embodiments, the images can include a first image and a second image, the performing the pose detection respectively generates a first landmark and a second landmark, the determination of the repetitive motion further includes determining a first pattern and a second pattern, and the method further includes: determining a deduplicated pattern based on a comparison of the first pattern and the second pattern; and determining the at least one repetitive motion based on the deduplicated pattern.

In another embodiment, determining the at least one repetitive motion based on the pattern further includes generating a distance time series data vector (e.g., a vector time series data representing a list of numbers) based on the projection of the points onto the principle component axes; generating a second time series data based on a determination of the maxima of the distance time series data vector; determining zero crossings of the second time series data; and determining a number of zero-crossing pairs having associated opposing directions based on the zero crossings. In some embodiments, the generating a second time series data based on maxima of the distance time series data further includes: maximizing a function including a linear combination of components of the distance time series data vector. In some embodiments, after determining the second time series, the disclosed systems can be configured to discard data in the second time series that is older than a predetermined number of the latest zero crossings, while also satisfying the condition that no more data is discarded than needed to keep a minimum amount of time series data. Further, the resulting shorter time series can be normalized by magnitude, and optionally can be bias corrected, before the disclosed systems proceed to find zero crossings in the time series data. In another embodiment, the determination of the zero crossings of the second time series data further includes: performing a debouncing process wherein a first zero crossing and a second zero crossing having a difference in magnitude below a predetermined threshold are determined as a same zero crossing. In some embodiments, some operations can be executed for each new video frame added; accordingly, a new set of zero crossings can be determined. In some case, the determined set of zero crossings can be duplicates of some of the previously determined, existing zero crossings; accordingly, the disclosed systems can be configured to add only the non-duplicated zero crossings to the existing zero crossings. In another aspect, the deduplication process can begin processing with the first of the newly determined zero crossings, and can identify the newly determined zero crossings with a zero crossing in the existing set that is closest in time but has time difference within a predetermined threshold. If the zero crossings match, the next zero crossing in the newly discovered set can be identified with the next zero crossing in the existing set, etc., until the disclosed systems reach the end of either set of zero crossings. If there are any remaining, unidentified zero crossings in the newly discovered set, those zero crossings can be considered non-duplicates and can be appended to the end of the existing set at the end of the process.

In some embodiments, the method further includes: determining points identifying the landmark (e.g., standard deviations and/or principal components of the landmarks, which can optionally filtered as previously mentioned) and a duration parameter associated with the duration of the at least one repetitive motion; and inputting the points and the duration parameter to a machine learning algorithm to obtain a classification result of the repetitive motion, the classification result identifying the repetitive motion into a predetermined type. The points can include a pair of two-dimensional points in some examples. In other examples, the pair of two-dimensional points can be represented differently, such as in one two-dimensional point and a two-dimensional direction vector. In some examples, a repetitive motion can be determined by a unique pair of adjacent zero crossings in opposite directions. In another embodiment, the machine learning algorithm includes a multi-layer neural network. In some embodiments, the video is captured by a camera on a mobile device. In another embodiment, the feature includes at least one of moving object and at least a portion of a body of a moving human.

Further, systems and non-transitory computer-readable media can be configured to perform operations substantially similar to those described above.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for determining a number of repetitive motions in a video, the method executed by a processor, the method comprising:
   determining a plurality of images from a video, wherein the plurality of images are segmented from at least one video frame of the video;
   performing a landmark detection process on a feature of the plurality of images to generate one or more landmarks;
   determining one or more principal component axes on a plurality of points associated with a given landmark of the one or more landmarks; and
   determining at least one repetitive motion based on a pattern associated with a projection of the plurality of points onto the principal component axes, wherein the determining the repetitive motion is based on a number of zero-crossing pairs associated with the projection of the plurality of points onto the one or more principal component axes.

2. The method of claim 1, wherein the plurality of images comprise a first image and a second image, wherein the performing the landmark detection process respectively generates a first landmark and a second landmark, wherein the determining the at least one repetitive motion further comprises determining a first pattern and a second pattern, and wherein the method further comprises:
   determining a deduplicated pattern based on a comparison of the first pattern and the second pattern; and
   determining the at least one repetitive motion based on the deduplicated pattern.

3. The method of claim 1, wherein the determining the repetitive motion based on the number of zero-crossing pairs further comprises:
   generating a distance time series data vector based on the projection of the plurality of points onto the principal component axes;
   generating a second time series data based on a determination of the maxima of the distance time series data vector;
   determining zero crossings of the second time series data; and
   determining the number of zero-crossing pairs having associated opposing directions based on the zero crossings.

4. The method of claim 3, wherein the generating the second time series data based on the maxima of the distance time series data vector further comprises:
   maximizing a function comprising a linear combination of components of the distance time series data vector.

5. The method of claim 3, wherein the determining the zero crossings of the second time series data further comprises:
   performing a debouncing process, wherein a first deviation from a first zero crossing and a second deviation from a second zero crossing have a difference in magnitude below a predetermined threshold, and wherein the first zero crossing and the second zero crossing are determined as a same zero crossing.

6. The method of claim 1, wherein the performing the landmark detection process further comprises:
   determining landmark points identifying a given landmark's motion and a duration parameter associated with a duration of the at least one repetitive motion; and
   inputting the landmark points and the duration parameter to a machine learning algorithm to obtain a classification result of the repetitive motion, the classification result identifying the repetitive motion into a predetermined type.

7. The method of claim 6, wherein the machine learning algorithm comprises a multi-layer neural network.

8. The method of claim 1, wherein the video is captured by a camera on a mobile device.

9. The method of claim 1, wherein the feature comprises at least one of a moving object and at least a portion of a body of a moving human.

10. A non-transitory computer-readable medium storing computer-executable instructions which, when executed by a processor, cause the processor to perform operations for determining a number of repetitive motions in a video, the operations comprising:
    determine a plurality of images from a video, wherein the plurality of images are segmented from at least one video frame of the video;
    perform a landmark detection process on a feature of the plurality of images to generate one or more landmarks;
    determine one or more principal component axes on a plurality of points associated with a given landmark of the one or more landmarks; and
    determine at least one repetitive motion based on a pattern associated with a projection of the plurality of points onto the principal component axes, wherein the determining the repetitive motion is based on a number of zero-crossing pairs associated with the projection of the plurality of points onto the one or more principal component axes.

11. The non-transitory computer-readable medium of claim 10, wherein the plurality of images comprise a first image and a second image, wherein the operation to perform the landmark detection process respectively generates a first landmark and a second landmark, wherein the operation to determine the repetitive motion further determines a first pattern and a second pattern, and wherein the operations further comprise:
    determine a deduplicated pattern based on a comparison of the first pattern and the second pattern; and
    determine the at least one repetitive motion based on the deduplicated pattern.

12. The non-transitory computer-readable medium of claim 10, wherein the operation to determine the repetitive motion based on the number of zero-crossing pairs further comprises operations to:
    generate a distance time series data vector based on the projection of the points onto the principal component axes;
    generate a second time series data based on a determination of the maxima of the distance time series data vector;
    determine zero crossings of the second time series data; and
    determine the number of zero-crossing pairs having associated opposing directions based on the zero crossings.

13. The non-transitory computer-readable medium of claim 12, wherein the operation to generate the second time series data based on the maxima of the distance time series data vector further comprises operations to:

maximize a function comprising a linear combination of components of the distance time series data vector.

14. The non-transitory computer-readable medium of claim 12, wherein the operation to determine the zero crossings of the second time series data further comprises operations comprising:

perform a debouncing process, wherein a first deviation from a first zero crossing and a second deviation from a second zero crossing have a difference in magnitude below a predetermined threshold, and wherein the first zero crossing and the second zero crossing are determined as a same zero crossing.

15. The non-transitory computer-readable medium of claim 10, wherein the computer-executable instructions to perform the landmark detection process further comprises operations comprising:

determine landmark points identifying a given landmark's motion and a duration parameter associated with a duration of the at least one repetitive motion; and input the points and the duration parameter to a machine learning algorithm to obtain a classification result of the repetitive motion, the classification result identifying the repetitive motion into a predetermined type.

16. The non-transitory computer-readable medium of claim 15, wherein the machine learning algorithm comprises a multi-layer neural network.

17. The non-transitory computer-readable medium of claim 10, wherein the video is captured by a camera on a mobile device.

18. The non-transitory computer-readable medium of claim 10, wherein the feature comprises at least one of a moving object and at least a portion of a body of a moving human.

19. A device for determining a number of repetitive motions in a video, comprising:

a camera and a processor, wherein the processor is configured to:

determine a plurality of images from a video, wherein the plurality of images are segmented from at least one video frame of the video;

perform a landmark detection process on a feature of the plurality of images to generate one or more landmarks;

determine one or more principal component axes on a plurality of points associated with a given landmark of the one or more landmarks; and determine at least one repetitive motion based on a pattern associated with a projection of the plurality of points onto the principal component axes, wherein determining the repetitive motion is based on a number of zero-crossing pairs associated with the projection of the plurality of points onto the principal component axes.

20. The device of claim 19, wherein the plurality of images comprise a first image and a second image, wherein the processor is configured to generate a first pose landmark and a second pose landmark, wherein the processor is configured to determine a first pattern and a second pattern, and wherein the processor is further configured to:

determine a deduplicated pattern based on a comparison of the first pattern and the second pattern; and determine the at least one repetitive motion based on the deduplicated pattern.

* * * * *